(12) United States Patent
Kim et al.

(10) Patent No.: US 11,549,498 B2
(45) Date of Patent: Jan. 10, 2023

(54) LINEAR COMPRESSOR

(71) Applicant: LG Electronics Inc., Seoul (KR)

(72) Inventors: Donghan Kim, Seoul (KR); Youngkyun Lim, Seoul (KR); Kiil Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 16/983,431

(22) Filed: Aug. 3, 2020

(65) Prior Publication Data

US 2021/0190059 A1   Jun. 24, 2021

(30) Foreign Application Priority Data

Dec. 20, 2019   (KR) .......................... 10-2019-0172199

(51) Int. Cl.
  *F04B 39/00* (2006.01)
  *F04B 39/10* (2006.01)
  (Continued)

(52) U.S. Cl.
  CPC .......... *F04B 39/0016* (2013.01); *F04B 35/04* (2013.01); *F04B 35/045* (2013.01);
  (Continued)

(58) Field of Classification Search
  CPC .... F04B 39/0016; F04B 39/10; F04B 39/121; F04B 39/0027; F04B 39/1033;
  (Continued)

(56) References Cited

U.S. PATENT DOCUMENTS 5,192,200 A * 3/1993 Lilie ................... F04B 39/1073
                                                      137/855
5,521,000 A * 5/1996 Owens .................... F01L 3/205
                                                      123/65 V (Continued)

FOREIGN PATENT DOCUMENTS

EP   1221554 A1 *  7/2002  ............. F16K 15/12
EP   1221554      10/2002
(Continued)

OTHER PUBLICATIONS

Density of Plastics—Technical Properties: https://omnexus.specialchem.com/polymer-properties/properties/density (Year: 2018).*
(Continued)

*Primary Examiner* — Peter J Bertheaud
(74) *Attorney, Agent, or Firm* — Fish & Richardson P.C.

(57) ABSTRACT

A linear compressor includes a discharge valve detachably attached to a front end surface of a cylinder to open and close a compression space of the cylinder; and a valve spring elastically supporting a rear surface of the discharge valve to press the discharge valve toward the front end surface of the cylinder. The discharge valve includes reinforced fiber, and the reinforced fiber is arranged parallel to the front end surface of the cylinder. Accordingly, while a rigidity of the discharge valve is improved, a weight of the valve is reduced to enhance responsiveness of the valve, suppress abrasion of the cylinder, and reduce striking sound.

9 Claims, 23 Drawing Sheets

(51) Int. Cl.
*F16K 17/04* (2006.01)
*F16K 25/00* (2006.01)
*F04B 35/04* (2006.01)
*F16K 15/14* (2006.01)
*F16K 99/00* (2006.01)
*F04B 39/12* (2006.01)

(52) U.S. Cl.
CPC .......... *F04B 39/0027* (2013.01); *F04B 39/10* (2013.01); *F04B 39/102* (2013.01); *F04B 39/1026* (2013.01); *F04B 39/1033* (2013.01); *F04B 39/1066* (2013.01); *F16K 15/144* (2013.01); *F16K 15/148* (2013.01); *F16K 17/04* (2013.01); *F16K 25/005* (2013.01); *F16K 99/0001* (2013.01); *F04B 39/12* (2013.01); *F04B 39/121* (2013.01); *F04B 2201/02* (2013.01); *F04B 2201/06* (2013.01); *F05B 2210/14* (2013.01); *F16K 2099/008* (2013.01); *F16K 2099/0073* (2013.01)

(58) Field of Classification Search
CPC ................ F04B 39/102; F04B 39/1026; F04B 39/1066; F04B 35/04; F04B 35/045; F04B 2201/02; F04B 2201/06; F04B 39/12; F16K 15/148; F16K 15/144; F16K 17/02; F16K 2099/008; F16K 25/005; F16K 17/04; F16K 99/0001; F16K 2099/0073; F05B 2210/14; F05B 2280/6002

USPC ........................................... 137/854; 251/358
See application file for complete search history.

(56) References Cited

U.S. PATENT DOCUMENTS

| | | | |
|---|---|---|---|
| 2006/0102240 A1* | 5/2006 | Spiegl | F16K 15/10 |
| | | | 137/855 |
| 2021/0048113 A1* | 2/2021 | Trulear | F16K 25/005 |

FOREIGN PATENT DOCUMENTS

| | | | | |
|---|---|---|---|---|
| JP | H01063669 | | | 3/1989 |
| JP | H06323449 | | | 11/1994 |
| KR | 20010108966 | A | * | 12/2001 |
| KR | 100339599 | | | 6/2002 |
| KR | 1020060039177 | | | 5/2006 |
| KR | 20150040027 | | | 4/2015 |
| KR | 20160024217 | | | 3/2016 |
| KR | 20180097221 | A | * | 8/2018 |
| KR | 1020180097221 | | | 8/2018 |

OTHER PUBLICATIONS

Extended European Search Report in EP Appln. No. 201908720, dated Nov. 27, 2020, 7 pages.
Korean Office Action in KR Appln. No. 1020190172199, dated Dec. 20, 2019, 17 pages (with English translation).
KR Office Action in Korean Appln. No. 10-2019-0172199, dated Jul. 7, 2021, 8 pages (with English translation).

* cited by examiner

LINEAR COMPRESSOR

CROSS-REFERENCE TO RELATED APPLICATION

Pursuant to 35 U.S.C. § 119(a), this application claims the benefit of the earlier filing date and the right of priority to Korean Patent Application No. 10-2019-0172199, filed on Dec. 20, 2019, the contents of which is incorporated by reference herein in its entirety.

TECHNICAL FIELD

The present disclosure relates to a linear compressor equipped with a discharge valve.

BACKGROUND

A linear compressor may be classified into an oil-lubricated linear compressor (hereinafter referred to as an oil bearing compressor) and a gas-lubricated linear compressor (hereinafter referred to as a gas bearing compressor) according to a lubrication method. As disclosed in Patent Document 1 (Korean Patent Laid-Open Publication No. KR10-2015-0040027), the oil bearing compressor is configured such that a predetermined amount of oil is stored in a compressor casing and is used for lubricating between a cylinder and a piston.

On the other hand, as disclosed in Patent Document 2 (Korean Patent Laid-Open Publication No. KR10-2016-0024217), the gas bearing compressor has a structure of inducing a part of refrigerant discharged from a compression space between a cylinder and a piston so as to lubricate between the cylinder and the piston by gas force of the refrigerant, instead of storing oil in a compressor casing.

In the linear compressor as described above, the piston is slidably inserted into a linear cylinder, and the piston is connected to a mover of a linear motor to perform a reciprocating motion with the mover. As the piston reciprocates in the cylinder, a series of processes of sucking, compressing, and discharging refrigerant into the compression space is repeated. A discharge valve is provided on a front end surface of the cylinder to open and close the compression space. An elastic member is provided on a rear surface of the discharge valve to quickly move the discharge valve to a closed position during a suction stroke of the piston.

At this time, the discharge valve transmits an impact to the front end surface of the cylinder, which may cause abrasion or collision noise between the discharge valve and the cylinder. Such a phenomenon may occur more significantly in the gas bearing compressor than in the oil bearing compressor.

In the oil bearing compressor, oil mixed with a refrigerant is supplied between the cylinder and the discharge valve to buffer impacts or to reduce abrasion between the cylinder and the discharge valve occurred while the discharge valve is opening and closing. However, as the gas bearing compressor is not filled with oil inside the casing, surfaces between the cylinder and the discharge valve are not buffered or lubricated. Accordingly, the gas bearing compressor has an aspect of securing rigidity of the discharge valve against collision and also securing abrasion resistance of the discharge valve.

For this reason, a discharge valve made of a metal material was used in the related art. However, since the discharge valve made of a metal material is heavy in weight, a responsiveness of the valve is lowered and this may cause a compression loss due to abrasion of the front end surface of the cylinder. On the other hand, a discharge valve made of a plastic material can enhance the responsiveness of the valve, but the durability of the valve may be deteriorated because the rigidity of the valve is not secured.

SUMMARY

An aspect of the present disclosure is to provide a linear compressor capable of enhancing responsiveness of a discharge valve, suppressing abrasion between the discharge valve and a cylinder, and reducing striking sound between the discharge valve and the cylinder.

In addition, another aspect of the present disclosure is to provide a linear compressor including a discharge valve made of a material capable of increasing abrasion resistance while achieving light weight.

Furthermore, another aspect of the present disclosure is to provide a linear compressor in which material forming a discharge valve is arranged to suppress abrasion of a cylinder.

Furthermore, another aspect of the present disclosure is to provide a linear compressor in which a discharge valve thereof is formed of a composite material and a content of the material reducing weight and enhancing durability can be increased.

Another aspect of the present disclosure is to provide a linear compressor capable of reducing material cost while simplifying a manufacturing process of a discharge valve.

Furthermore, the present disclosure is to provide a linear compressor capable of enhancing reliability by fabricating a discharge valve in combination of a plurality of materials while allowing the plurality of materials to be closely adhered to one another.

Particular implementations described herein provide a linear compressor that includes a cylinder, a discharge valve, and a valve spring. The cylinder may define a compression space. The discharge valve may be detachably attached to an end surface of the cylinder and configured to open and close the compression space of the cylinder. The valve spring may be configured to press the discharge valve toward the end surface of the cylinder. The discharge valve may include reinforced fibers that are disposed in parallel to the end surface of the cylinder.

In some implementations, the linear compressor described herein may include one or more of the following features. The reinforced fibers may be interwoven with each other. The discharge valve may include a composite unit having a plurality of composite sheets that are stacked in multiple layers. Each of the plurality of composite sheets may include the reinforced fibers that are interwoven in a lattice shape. The plurality of composite sheets may include a first composite sheet and a second composite sheet that is stacked on the first composite sheet. The reinforced fibers of the first composite sheet may have a same pattern as the reinforced fibers of the second composite sheet. The reinforced fibers may be disposed in one direction on a plane. The discharge valve may include a composite unit having a plurality of composite sheets that are stacked in multiple layers. Each of the plurality of composite sheets may include reinforced fibers that are disposed in one direction in each of the multiple layers. The plurality of composite sheets may include a first composite sheet and a second composite sheet that is stacked on the first composite sheet. The reinforced fibers of the first composite sheet may be disposed in a different direction from the reinforced fibers of the second composite sheet. At least a portion of the discharge valve may include a material having plastic resin that is impregnated in the reinforced fibers. At least 50% of a volume of the discharge valve includes the material.

Particular implementations described herein provide a linear compressor that includes a cylinder, a discharge valve, and a valve spring. The cylinder may define a compression space. The discharge valve may be detachably attached to an end surface of the cylinder and configured to open and close the compression space of the cylinder. The valve spring may be configured to press the discharge valve toward the end surface of the cylinder. The discharge valve may include a valve body portion and a spring coupling portion. The valve body portion may have a first surface and a second surface opposite to the first surface. The first surface may face the end surface of the cylinder. The spring coupling portion may be disposed at the second surface of the valve body portion and connect to the valve spring. The valve body portion may include reinforced fibers at the first surface that are disposed in parallel to the end surface of the cylinder.

In some implementations, the linear compressor described herein may include one or more of the following features. The spring coupling portion may include reinforced fibers. The reinforced fibers of the valve body portion may be disposed in a same pattern as the reinforced fibers of the spring coupling portion. The reinforced fibers of the valve body portion may be disposed in a different pattern from the reinforced fibers of the spring coupling portion. The reinforced fibers may be irregularly disposed in the spring coupling portion. The reinforced fibers of the valve body portion may be disposed in a different pattern from the reinforced fibers of the spring coupling portion. The spring coupling portion may include a material that is lighter than a material of the valve body portion. The material of the spring coupling portion may have a greater rigidity than the material of the valve body portion. The valve body portion may be integral with the spring coupling portion as a single piece. The valve body portion may be separate from the spring coupling portion and connected to the spring coupling portion. The valve body portion may be thinner than the spring coupling portion. The valve body portion may have a disk shape. The spring coupling portion may be separate from the spring coupling portion and connected to the second surface of the valve body portion. The valve body portion may include a fixing protrusion at the second surface. The spring coupling portion may include a fixing groove or a fixing hole that faces the second surface of the valve body portion and receive the fixing protrusion of the valve body portion. The spring coupling portion includes a fixing protrusion. The valve body portion may include a fixing groove or a fixing hole that receives the fixing protrusion of the spring coupling portion. The valve body portion may have an annular shape defining a hollow portion. The spring coupling portion may include a coupling protrusion that is inserted into the hollow portion. The hollow portion of the valve body portion may include a fixing protrusion or a first fixed end at an inner circumferential surface of the hollow portion. The coupling protrusion of the spring coupling portion may include a fixing groove that receives the fixing protrusion, or a second fixed end that connects the first fixed end. The coupling protrusion of the spring coupling portion may include a fixing protrusion or a first fixed end at an outer circumferential surface of the coupling protrusion. The hollow portion of the valve body portion may include a fixing groove that receives the fixing protrusion, or a second fixed end that connects the first fixed end.

In order to achieve the aspects of the present disclosure, there is provided a discharge valve including one or more sheets wherein plastic resin is impregnated into reinforced fiber and the reinforced fiber is arranged parallel to a front end surface of a cylinder.

In addition, in order to achieve the aspects of the present disclosure, there is provided a linear compressor including a valve member detachably attached to a front end surface of a cylinder to open and close a compression space of the cylinder, and an elastic member to elastically support a rear surface of the valve member by pressing the valve member toward the front end surface of the cylinder, wherein the valve member is formed by impregnating resin into reinforced fiber, and a lengthwise direction of the reinforced fiber is arranged parallel to the front end surface of the cylinder.

Here, a piston to vary a volume of the compression space may be inserted reciprocally into an inner circumferential surface of the cylinder, and a gas bearing to supply part of a refrigerant discharged from the compression space into a gap between the inner circumferential surface of the cylinder and an outer circumferential surface of the piston may be provided in the cylinder.

In addition, in order to achieve the aspects of the present disclosure, there is provided a linear compressor, including a discharge valve detachably attached to a front end surface of a cylinder to open and close a compression space of the cylinder, and a valve spring elastically supporting a rear surface of the discharge valve to press the discharge valve toward the front end surface of the cylinder, wherein the discharge valve includes reinforced fiber, and the reinforced fiber is arranged parallel to the front end surface of the cylinder.

Here, the discharge valve may be formed by weaving the reinforced fiber.

Then, the discharge valve may include a composite unit in which the reinforced fiber is woven into a lattice shape to form composite sheets, and the composite sheets are stacked in multiple layers to form the composite unit, wherein the composite unit may be formed such that reinforced fibers of neighboring composite sheets are formed in a pattern same as each other.

Here, the discharge valve may be formed such that the reinforced fiber is arranged in one direction on a plane.

Then, the discharge valve may include a composite unit in which the reinforced fiber is arranged in one direction on a plane to form composite sheets, and the composite sheets are stacked in multiple layers to form the composite unit, wherein the composite unit is formed such that reinforced fibers of neighboring composite sheets are arranged in different directions.

Here, at least a portion of the discharge valve may be formed of a material in which plastic resin is impregnated in the reinforced fiber.

In addition, at least 50% of discharge valve may contain reinforced fiber in a portion where the plastic resin is impregnated in the reinforced fiber.

Here, the discharge valve may include a valve body portion facing the front end surface of the cylinder, and a spring coupling portion provided on a rear surface of the valve body portion and the valve spring is coupled thereto, wherein the valve body portion may be configured such that the reinforced fiber on a surface facing the front end surface of the cylinder is arranged parallel to the front end surface of the cylinder.

And, the reinforced fiber of the valve body portion and the reinforced fiber of the spring coupling portion may be formed in a same pattern.

In addition, the reinforced fiber of the valve body portion and the reinforced fiber of the spring coupling portion may be formed in different patterns.

In addition, the reinforced fiber in the spring coupling portion may be arranged in an irregularly distributed manner.

The spring coupling portion may be formed of a material lighter than that of the valve body portion.

In addition, the spring coupling portion may be formed of a material having greater rigidity than that of the valve body portion.

Here, the valve body portion and the spring coupling portion may be defined in a single body.

Here, the valve body portion and the spring coupling portion may be post-assembled.

In addition, a thickness of the valve body portion may be thinner than that of the spring coupling portion.

And, the valve body portion may be defined in a shape of a disk, and the spring coupling portion may be coupled to the rear surface of the valve body portion.

In addition, a fixing protrusion may be formed either on the rear surface of the valve body portion or on a surface of the spring coupling portion facing the rear surface of the valve body portion, and a fixing groove or a fixing hole into which the fixing protrusion is inserted may be formed on a surface where the fixing protrusion is facing.

In addition, the valve body portion may be defined in an annular shape having a hollow portion, and the spring coupling portion may be provided with a coupling protrusion to be inserted into the hollow portion.

In addition, a fixing protrusion or a first fixed end may be formed either on an inner circumferential surface of the hollow portion or on an outer circumferential surface of the coupling protrusion, and a fixing groove into which the fixing protrusion is inserted or a second fixed end to which the first fixed end is joined may be formed on a side where the fixing protrusion or the first fixed end is facing.

DETAILED DESCRIPTION

Description will now be given in detail of a linear compressor according to exemplary embodiments disclosed herein, with reference to the accompanying drawings.

The linear compressor according to this embodiment is configured to perform an operation of sucking and compressing a fluid and discharging the compressed fluid, and may be a component of a refrigeration cycle device. Hereinafter, the fluid is described as an example of a refrigerant circulating through the refrigeration cycle. In addition, in this embodiment, a reciprocating direction of a piston is defined as an axial direction, a compressing direction of the piston is defined as a front side, and a sucking direction is defined as a rear side.

Figure 1:
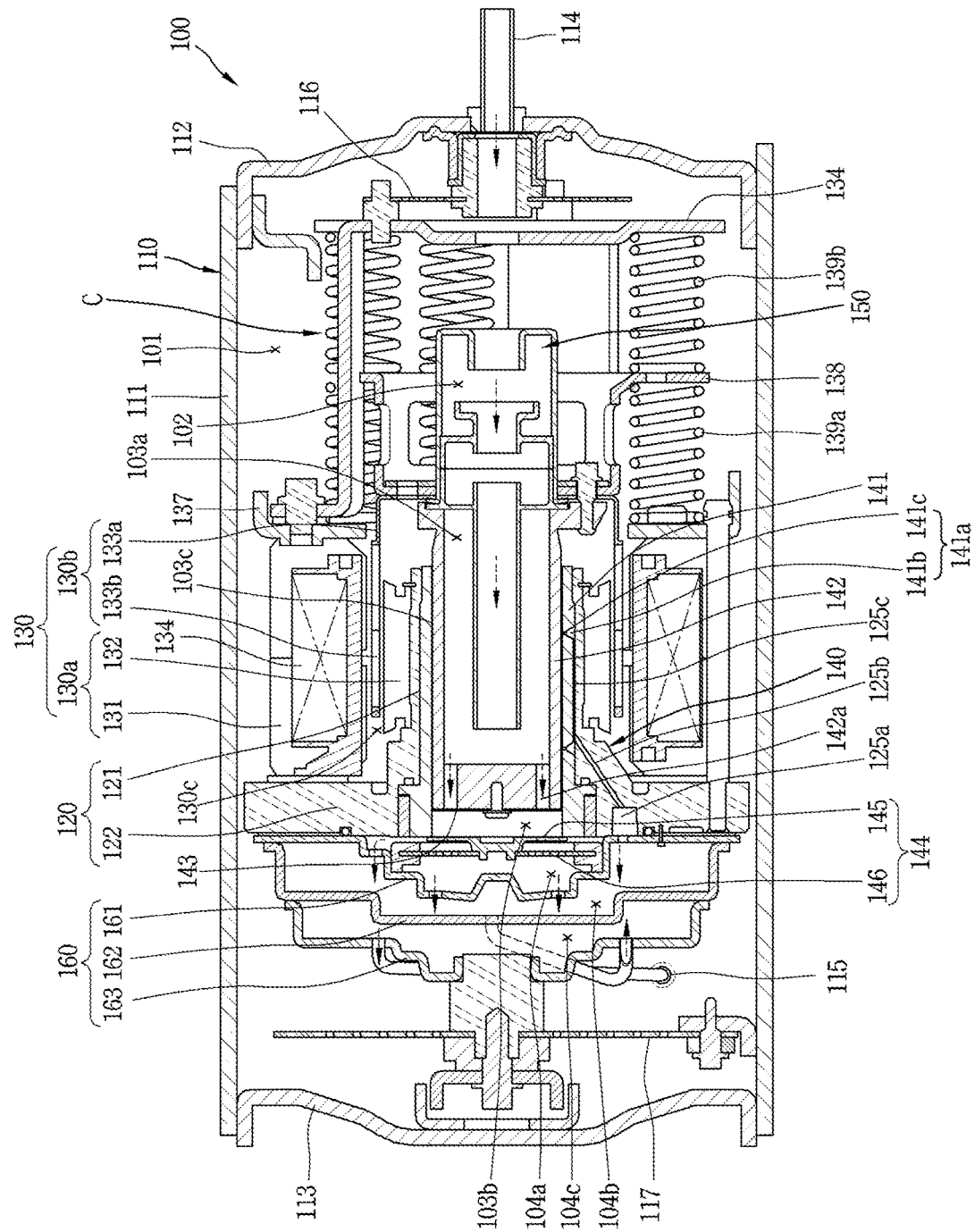
FIG. 1 is a sectional view illustrating an inside of a linear compressor in accordance with the present disclosure.

FIG. 1 is a sectional view illustrating an inside of a linear compressor in accordance with the present disclosure.

Referring to FIG. 1, in a linear compressor 100 according to this embodiment, a frame 120 may be elastically supported by support springs 116 and 117 in an inner space of a casing 110. And, a linear motor 130 to generate a driving force and a compression unit 140 operated by the linear motor 130 to compress refrigerant may be supported by the frame 120. Accordingly, the frame 120, the linear motor 130, and the compression unit 140 are elastically supported by the support springs 116 and 117 with respect to the casing 110.

The casing 110 may include a shell 111, a first shell cover 112 and a second shell cover 113 that cover both ends of the shell 111.

The shell 111 is defined in a cylindrical shape extending in a transverse direction. However, in some cases, the shell 111 may be defined in a cylindrical shape extending in a lengthwise direction. In this embodiment, a description will be given focusing on an example in which the shell 111 is extended in a transverse direction.

The shell 111 may have various inner diameters depending on a size of the linear motor 130. In the linear compressor of this embodiment, since an oil bearing is excluded and a gas bearing is applied, there is no need to fill an inner space 110a of the casing 110 with oil. Therefore, it may be preferable that an inner diameter of the shell 111 is formed as small as possible, but formed in just enough size to avoid contact between a flange portion 122 of the frame 120 to be explained later and an inner circumferential surface of the casing 110. Accordingly, in the linear compressor according to this embodiment, an outer diameter of the shell 111 may be formed very small compared to the aforementioned Patent Document 1.

Both ends of the shell 111 are opened, and the first shell cover 112 and the second shell cover 113 described above are coupled to both ends of the shell 111, respectively. The first shell cover 112 is coupled to seal a left opening end, which is a front side of the shell 111, and the second shell cover 113 is coupled to seal a right opening end, which is a rear side of the shell 111. Accordingly, the inner space 110a of the casing 110 is sealed. A suction pipe 114 is penetrated into the second shell cover 113, and a discharge pipe 115 is penetrated into the shell 111.

In addition, the frame 120 according to this embodiment is provided in the inner space 110a of the casing 110 as described above. A motor assembly including the linear motor 130 and a cylinder 141 constituting the compression unit 140 may be supportedly coupled to the frame 120. Accordingly, the frame 120 may be elastically supported with respect to the casing 110 by a first support spring 116 and a second support spring 117, together with the linear motor 130 and the compression unit 140.

The frame 120 may include a body portion 121 defined in a cylindrical shape, and the flange portion 122 extending in a radial direction from a front end of the body portion 121.

An inner stator 132 to be described later may be coupled to an outer circumferential surface of the body portion 121 and the cylinder 141 may be coupled to an inner circumferential surface of the body portion 121, respectively. An outer stator 131 to be described later may be coupled to a rear surface of the flange portion 122 and a discharge cover assembly 160 to be described later may be coupled to a front surface of the flange portion 122, respectively.

A bearing inlet groove 125a which forms part of a gas bearing to be explained later may be formed on one side of the front surface of the flange portion 122, and a bearing communication hole 125b may be formed from the bearing inlet groove 125a to the inner circumferential surface of the body portion 121 in a penetrating manner. A bearing communication groove 125c may be formed on the inner circumferential surface of the body portion 121 to communicate with the bearing communication hole 125b.

The bearing inlet groove 125a may be recessed by a predetermined depth in an axial direction, and the bearing communication hole 125b which is a hole having a smaller sectional area than the bearing inlet groove 125a may be formed inclined toward the inner circumferential surface of the body portion 121. The bearing communication groove 125c may be formed in an annular shape having a predetermined depth and axial length on the inner circumferential surface of the body portion 121. Alternatively, the bearing communication groove 125c may be formed on an outer circumferential surface of the cylinder 141 which is in contact with the inner circumferential surface of the body portion 121 or a half of the bearing communication groove 125c may be formed on the inner circumferential surface of the body portion 121 and another half may be formed on the outer circumferential surface of the cylinder 141.

The cylinder 141 may be provided with a gas hole 141a at a position corresponding to the bearing communication groove 125c. The gas hole 141a will be described again while describing the cylinder 141 of the compression unit 140.

The linear motor 130 according to this embodiment may include a stator 130a, and a mover 130b reciprocating with respect to the stator 130a.

The stator 130a may include the outer stator 131 fixed to the flange portion 122 of the frame 120, and the inner stator 132 disposed inside the outer stator 131 by a predetermined gap 130c from the outer stator 131. The inner stator 132 may be inserted into the outer circumferential surface of the body portion 121 so as to surround the body portion 121 of the frame 120.

The mover 130b may be provided with a magnet holder 133a and a magnet 133b supported by the magnet holder 133a. A spring supporter 138 may be coupled to another end of the magnet holder 133a together with a piston 142. A first resonance spring 139a and a second resonance spring 139b to resonate the mover 130b of the linear motor 130 and the piston 142 of the compression unit 140 are provided on both sides of the spring supporter 138. The first resonant spring 139a and the second resonant spring 139b according to this embodiment include compressed coil springs, but in some cases, may include magnetic resonance springs located between the stator 130a and the mover 130b of the linear motor 130 to reciprocate the mover 130b.

The compression unit 140 according to this embodiment may include the cylinder 141, the piston 142, a suction valve 143, and a discharge valve assembly 144.

The cylinder 141 may be formed of a material which is light and has excellent processability, such as an aluminum material (aluminum or aluminum alloy). The cylinder 141 may be formed in a cylindrical shape so as to have a compression space 103b therein and may be fixedly inserted into an inner circumferential surface of the frame 120. A suction muffler assembly 150 to be described later through which a refrigerant is sucked into the compression space 103b may be provided at a rear side of the cylinder 141, and the discharge cover assembly 160 to be explained later through which a refrigerant compressed in the compression space 103b is discharged may be provided at a front side of the cylinder 141.

A remaining part of the gas bearing for supplying discharged gas into a lubrication space 103c between the cylinder 141 and the piston 142 to lubricate between the cylinder 141 and the piston with the gas may be formed in the cylinder 141. For example, the cylinder 141 may have the gas hole 141a to guide the compressed refrigerant introduced into the bearing communication groove 125c to the lubrication space 103c formed between the inner circumferential surface of the cylinder 141 and an outer circumferential surface of the piston 142. The gas hole 141a penetrates the outer circumferential surface and the inner circumferential surface of the cylinder 141 in the radial direction at a position in communication with the bearing communication groove 125c.

The lubrication space 103c is a space formed between the inner circumferential surface of the cylinder 141 and the outer circumferential surface of the piston 142. And a position of the lubrication space 103c may be varied since the lubricating space 103c is provided according to a reciprocating motion of the piston 142. In addition, a rear side of the lubrication space 103c may communicate with a suction space 103a outside a range of the cylinder 141 while a front side of the lubrication space 103c communicates with the compression space 103b.

The gas hole 141a may have an inlet formed wide and an outlet formed as a fine through hole to play a role as a nozzle. For example, the gas hole 141a may include a gas guide groove 141b and a bearing hole 141c.

The gas guide groove 141b is recessed by a predetermined depth in a radial direction from the outer circumferential surface of the cylinder 141, and the bearing hole 141c penetrates from a bottom surface of the gas guide groove 141*b* to the inner circumferential surface of the cylinder 141. An inner diameter of the bearing hole 141*c* forming an outlet of the gas hole 141*a* is smaller than an inner diameter of the gas guide groove 141*b* forming an inlet of the gas hole 141*a*.

The gas guide groove 141*b* forming the inlet of the gas hole 141*a* may be provided with a filter (not shown) to block an introduction of foreign substances. The filter may be a mesh filter made of a metal or may be made by winding a fiber wire member such as a thin thread. Accordingly, the gas guide groove 141*b* and the bearing hole 141*c* may be formed individually so as to communicate with each other independently, or the gas guide groove 141*b* may be formed as an annular groove and the bearing hole 141*c* may be formed in plurality at predetermined intervals along a circumferential direction of the gas guide groove 141*b*.

The gas hole 141*a* may be formed only at a side adjacent to the compression space 103*b* (hereinafter, referred to as a front side) with respect to a middle portion of the cylinder 141 in an axial direction, or may be formed even at a rear side that is opposite to the front side in consideration of sagging of the piston 142.

The piston 142 may be formed of an aluminum material, like the cylinder 141. The piston 142 may have a suction flow path 103*a* therein, and may be formed in a cylindrical shape having a front end partially opened and a rear end completely opened. As described above, the piston 142 may have an open rear end connected to the magnet holder 133*a* so as to perform a reciprocating motion together with the magnetic holder 133*a*.

A suction port 142*a* communicating the suction flow path 103*a* with the compression space 103*b* may be formed on a front end of the piston 142. The suction valve 143 to selectively open and close the suction port 142*a* may be provided on a front surface of the piston 142. Accordingly, a refrigerant sucked into the inner space 110*a* of the casing 110 may open the suction valve 143 so as to flow into the compression space 103*b* in the cylinder 141 through the suction flow path 103*a* and the suction port 142*a* of the piston 142.

Meanwhile, the discharge valve assembly 144, which opens and closes the compression space 103*b*, may be provided at a front end of the cylinder 141. The discharge valve assembly 144 may be accommodated in a discharge space of the discharge cover assembly 160 provided on a front surface of the frame 120.

The discharge valve assembly 144 may include a discharge valve 145 and a valve spring 146. The discharge valve 145 may be defined in a disk shape or a hemispherical shape, and the valve spring 146 may be defined in a leaf spring or a compressed coil spring.

The discharge valve 145 includes a valve body portion 145*a* facing the cylinder 141 and a spring coupling portion 145*b* facing the discharge cover assembly 160.

The valve body portion 145*a* and the spring coupling portion 145*b* may be molded into a single body, or may be fabricated separately and assembled together after the fabrication. The discharge valve and a method for fabricating the discharge valve will be described in detail later.

The discharge cover assembly 160 may be defined in a single discharge cover or may be configured in a manner that a plurality of discharge covers is arranged to be sequentially communicated with one another. In this embodiment, an example in which a plurality of discharge covers is sequentially communicated will be described.

For example, when there are three discharge covers, a discharge space 104*a* (hereinafter, a first discharge space) of the discharge cover 161 (hereinafter, a first cover) coupled to the frame 120 may communicate with a discharge space 104*b* (hereinafter, a second discharge space) of a second discharge cover 162 (hereinafter, a second cover) coupled to a front side of the first cover 161. A second discharge space 104*b* may communicate with a discharge space 104*c* (hereinafter, a third discharge space) of a third discharge cover 163 (hereinafter, a third cover) coupled to a front side of the second cover 162.

In the drawings, unexplained reference numeral 102 denotes a noise space, 134 denotes a winding coil, 136 denotes a back cover, and 137 denotes a stator cover.

The linear compressor according to this embodiment of the present disclosure may operate as follows.

That is, when a current is applied to the winding coil 134 of the linear motor 130, a magnetic flux is formed between the outer stator 131 and the inner stator 132. The magnetic flux generates an electromagnetic force. Accordingly, the mover 130*b* including the magnet holder 133*a* and the magnet 133*b*, reciprocates in a gap between the outer stator 131 and the inner stator 132.

Then, the piston 142 connected to the magnet holder 133*a* performs a reciprocating motion in an axial direction in the cylinder 141, so that a volume of the compression space 103*b* is increased or decreased. At this time, when the piston 142 is moved backward and the volume of the compression space 103*b* is increased accordingly, the suction valve 143 is opened so that a refrigerant in the suction flow path 103*a* is introduced into the compression space 103*b*. On the other hand, when the piston 142 is moved forward and the volume of the compression space 103*b* is decreased accordingly, pressure in the compression space increases to open the discharge valve 145 so that the refrigerant in the compression space 103*b* is discharged to a first discharge space 104*a*.

Then, the refrigerant discharged to the first discharge space 104*a* moves to a third discharge space 104*c* through the second discharge space 104*b*. At this time, part of the refrigerant moving from the first discharge space 104*a* to the second discharge space 104*b* is introduced into the bearing inlet groove 125*a* forming an inlet of the gas bearing. The refrigerant is then supplied to the lubrication space 103*c* between the inner circumferential surface of the cylinder 141 and the outer circumferential surface of the piston 142 through the bearing communication hole 125*b*, the bearing communication groove 125*c*, and the gas hole 141*a* of the cylinder 141. Thereafter, high-pressure refrigerant supplied the lubrication space 103*c* lubricates between the cylinder 141 and the piston 142, and then partly flows into the compression space 103*b* and the rest flows into the suction space 103*a*.

The refrigerant moved from the second discharge space 104*b* to the third discharge space 104*c* is discharged outside the compressor through a loop pipe (not shown) and the discharge pipe 115 and is then moved to a condenser of the refrigeration cycle. This series of processes is repeatedly performed.

Meanwhile, in the linear compressor as described above, when the piston 142 moves forward and then moves back again, the volume of the compression space 103*b* increases in a state where the refrigerant in the compression space 103*b* is discharged into the first discharge space 104*a* (hereinafter, collectively referred to as a discharge space), and accordingly a pressure of the compression space 103*b* rapidly decreases. Then, the discharge valve 145 moves toward a front end surface of the cylinder 141 due to a difference between the pressure of the compression space 103*b* and a pressure of the discharge space 104*a*, thereby closing the compression space 103b. At this time, as the valve spring 146 elastically supporting the discharge valve 145 toward the cylinder 141 is provided on a rear surface of the discharge valve 145 (hereinafter, a surface facing the discharge cover is defined as a rear surface of the discharge valve), not only the pressure difference described above but also a restoring force of the valve spring 146 is affected when the discharge valve 145 is closed. Then, the discharge valve 145 strongly collides with the front end surface of the cylinder 141 to generate a collision force, and this collision force is transmitted to the cylinder 141 or to the discharge valve 145.

However, since the discharge valve 145 is defined in a hemispherical shape or in a plate thinner than the cylinder 141, the discharge valve 145 may be damaged or abraded when used for a long time. In addition, as high-temperature and high-pressure refrigerant discharged from the compression space 103b is filled in the discharge space 104a in which the discharge valve 145 is accommodated, the discharge valve 145 should be formed of a material that can withstand high temperature and high pressure. Further, the discharge valve 145 should be formed of a material as light as possible in consideration of the responsiveness of the valve.

Thus, in the related art, a technology in which the discharge valve 145 is formed of a material having high abrasion resistance and heat resistance, such as engineering plastic containing polyether ether ketone (PEEK), yet light in weight to secure durability and responsiveness of the discharge valve 145 is known.

However, engineering plastic such as PEEK can secure a needed level of responsiveness and heat resistance to the discharge valve 145, but may fail to secure a sufficient level in terms of durability, so durability may be deteriorated. In this regard, the entire discharge valve 145 may be formed of metal, or a portion of the discharge valve 145 may be formed of metal. However, in this case, a weight of the valve is increased, so that the responsiveness of the valve decreases and the cylinder 141 colliding with the discharge valve 145 may be abraded by the impact of the collision. When the cylinder 141 is formed of an aluminum material, abrasion of the cylinder may be further increased.

Thus, responsiveness and heat resistance can be secured in the discharge valve according to this embodiment by mixing reinforced fiber with engineering plastic to fabricate the discharge valve. Hereinafter, the engineering plastic will be described as a plastic resin.

Figure 2:
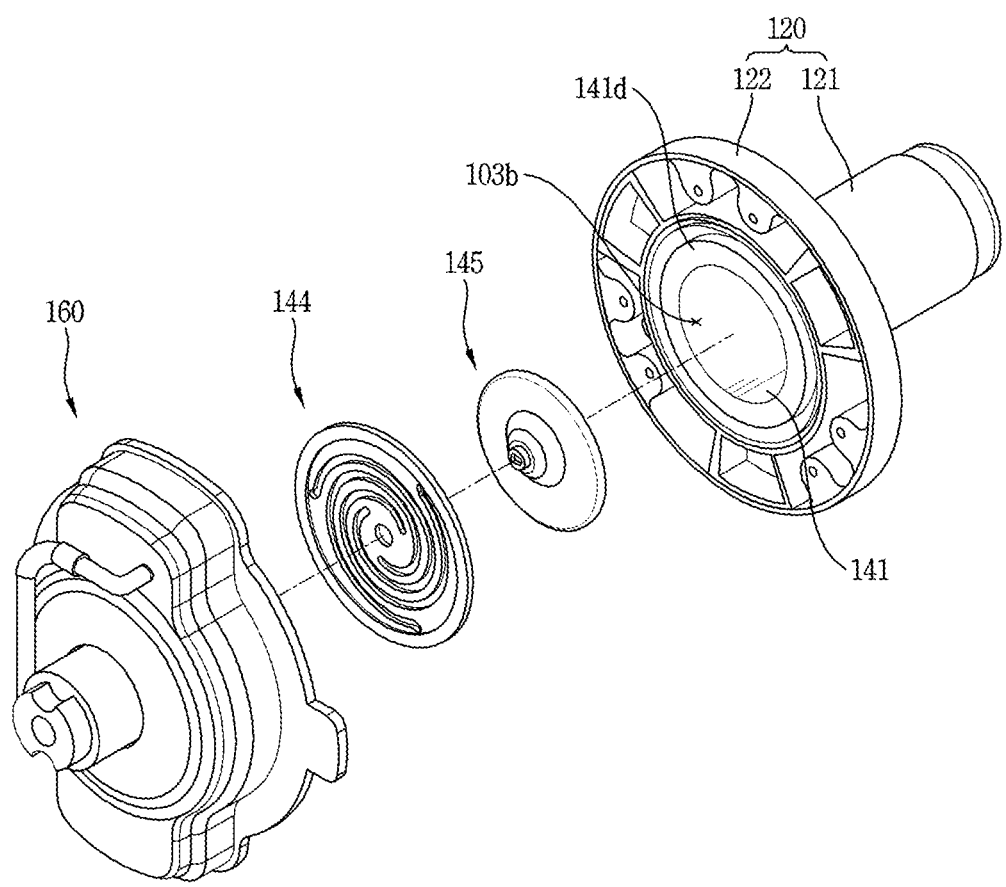
FIG. 2 is an exploded perspective view of a discharge valve and its peripheral members in FIG. 1.
Figure 3:
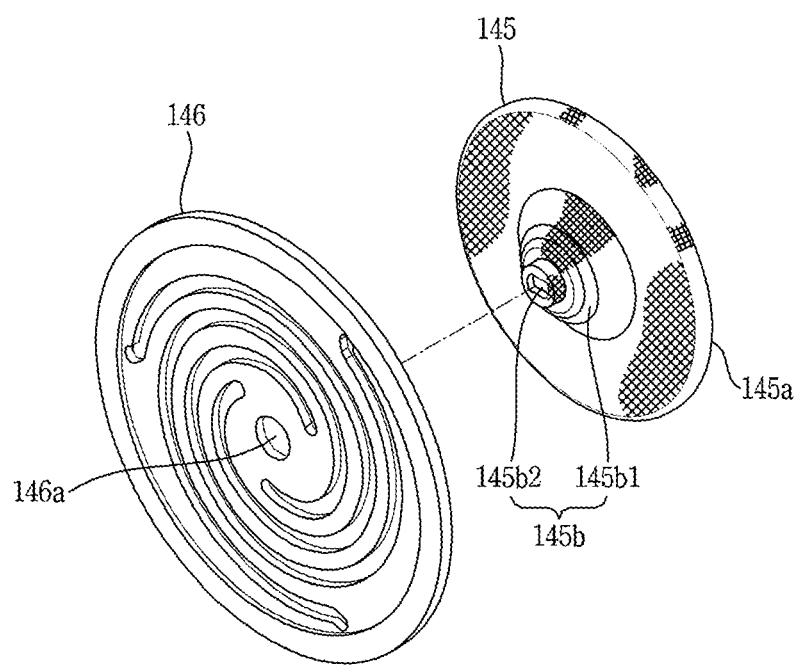
FIG. 3 is an exploded perspective view of a discharge value and a valve spring.

FIG. 2 is an exploded perspective view of the discharge valve and its peripheral members in FIG. 1, and FIG. 3 is an exploded perspective view of the discharge value and the valve spring.

Referring to FIGS. 2 and 3, the discharge valve assembly 144 according to this embodiment is located between the cylinder 141 and the discharge cover assembly 160, and accommodated in the discharge space 104a of the discharge cover assembly 160.

The discharge valve assembly 144 includes the discharge valve 145 detachably attached to the front end surface 141d of the cylinder 141 to open and close the compression space 103b, and the valve spring 146 coupled to a rear surface of the discharge valve 145 and defined in a leaf spring.

Since the discharge space 104a of the discharge cover assembly 160 creates a high temperature state, the discharge valve 145 accommodated in the discharge space 104a is preferably formed of a material having heat resistance. In addition, since the discharge valve 145 is detachably attached to the front end surface 141d of the cylinder 141, the discharge valve 145 is preferably formed to have abrasion resistance.

Thus, the discharge valve 145 according to this embodiment is formed of an engineering plastic material in which reinforced fiber is mixed therein (hereinafter, reinforced fiber plastic), as described above. A reinforced fiber plastic material is light and rigid, and has properties excellent in heat resistance and abrasion resistance. For example, the reinforced fiber plastic material includes reinforced fiber and plastic resin impregnated in the reinforced fiber.

In addition, the reinforced fiber may include carbon fiber or glass fiber. In particular, carbon fiber, which is advantageous for weight reduction of the discharge valve 145, may be applied in this embodiment. Therefore, the reinforced fiber plastic may include carbon fiber reinforced plastic.

In addition, the plastic resin includes thermoplastic resin. The thermoplastic resin may include engineering plastic, for example PEEK material. PEEK material is a soluble crystalline resin that can be melt-molded and has high heat resistance (250° C. for continuous use), so it can be used for compressors that create high temperature (about 150° C.) environments. In addition, the PEEK material is excellent in impact resistance and abrasion resistance along with high rigidity. Hereinafter, PEEK will be collectively described as a plastic resin.

However, as described above, when the discharge valve is fabricated with a material that is a composite of plastic resin and reinforced fiber, the rigidity of the discharge valve is enhanced whereas the front end surface of the cylinder colliding with the discharge valve may be abraded. Thus, the discharge valve according to this embodiment is to increase the rigidity of the discharge valve while suppressing abrasion of the cylinder.

Figure 4:
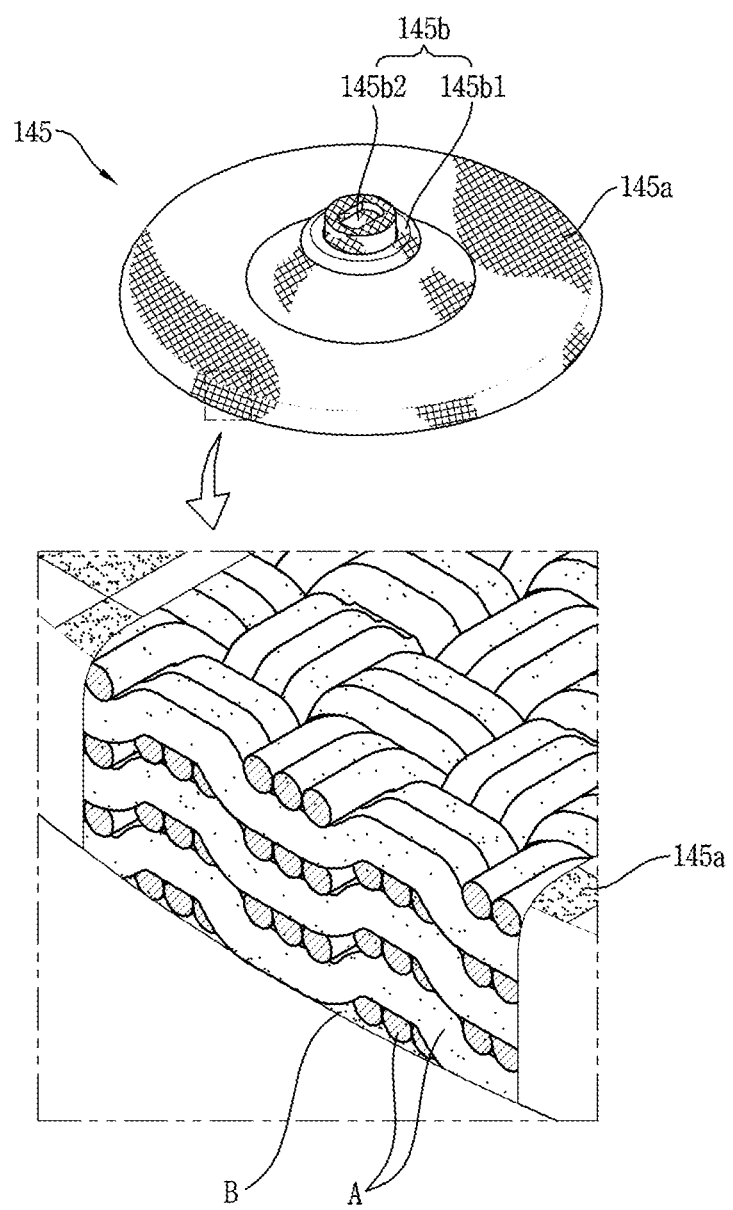
FIG. 4 is a cut perspective view of an embodiment of a discharge valve.
Figure 5:
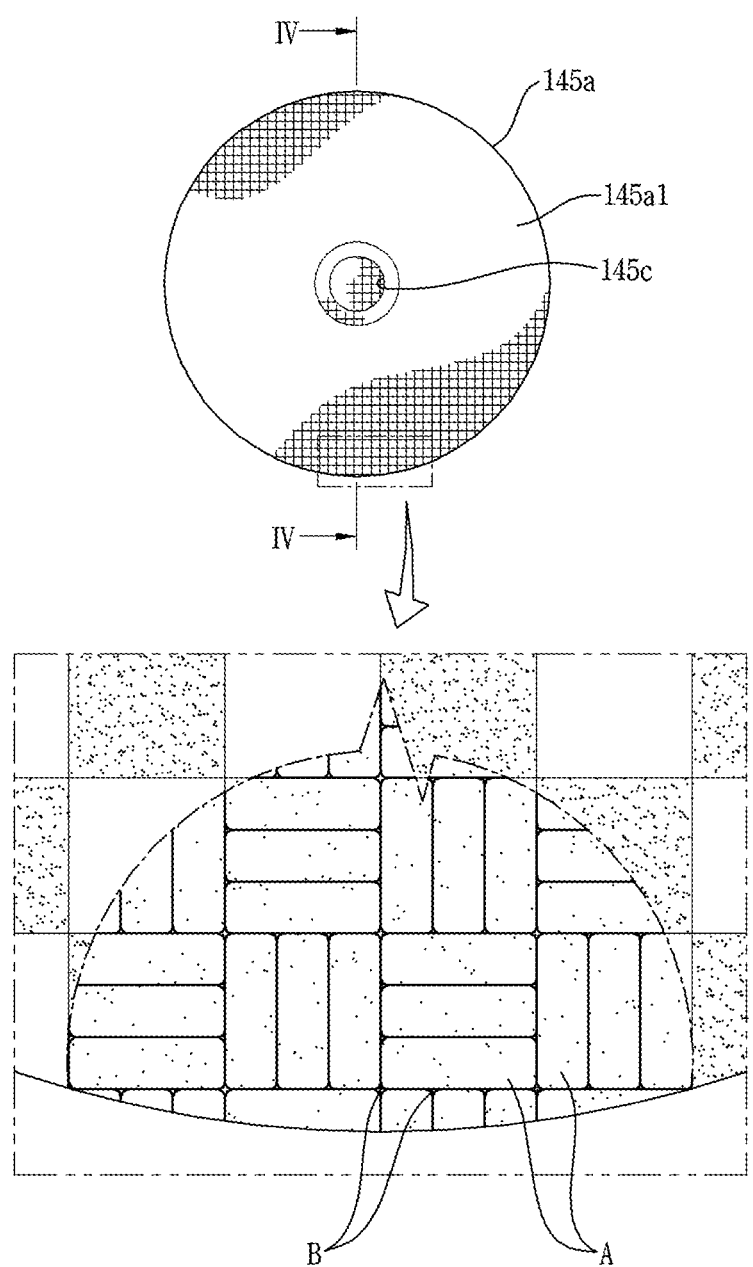
FIG. 5 is a planar view of a discharge valve according to FIG. 4 viewed from a rear side.
Figure 6:
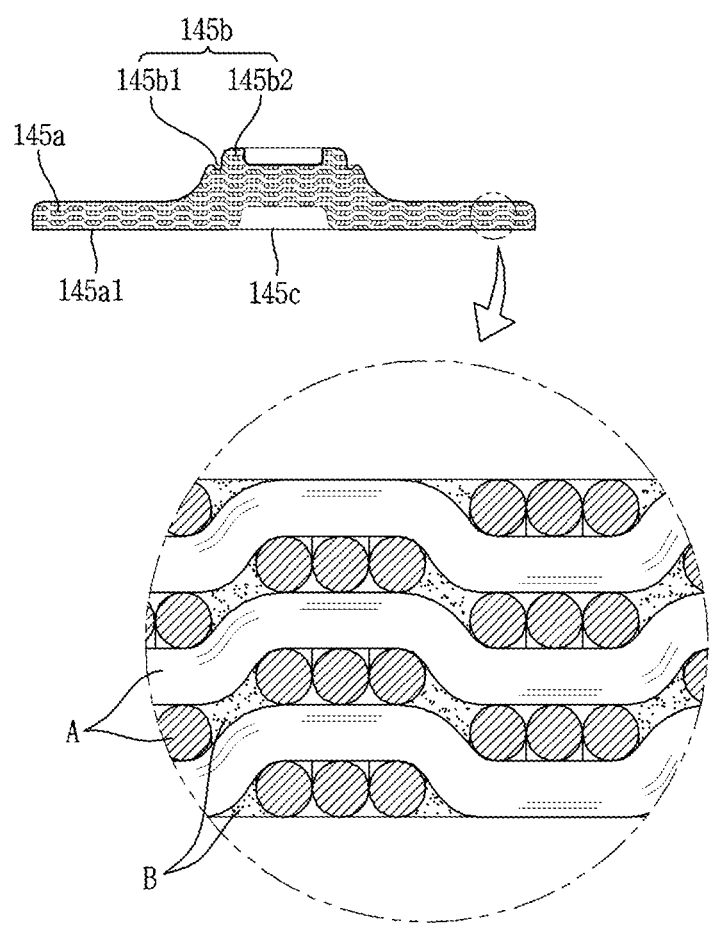
FIG. 6 is a sectional view taken along the line "IV-IV" of FIG. 5.
Figure 7:
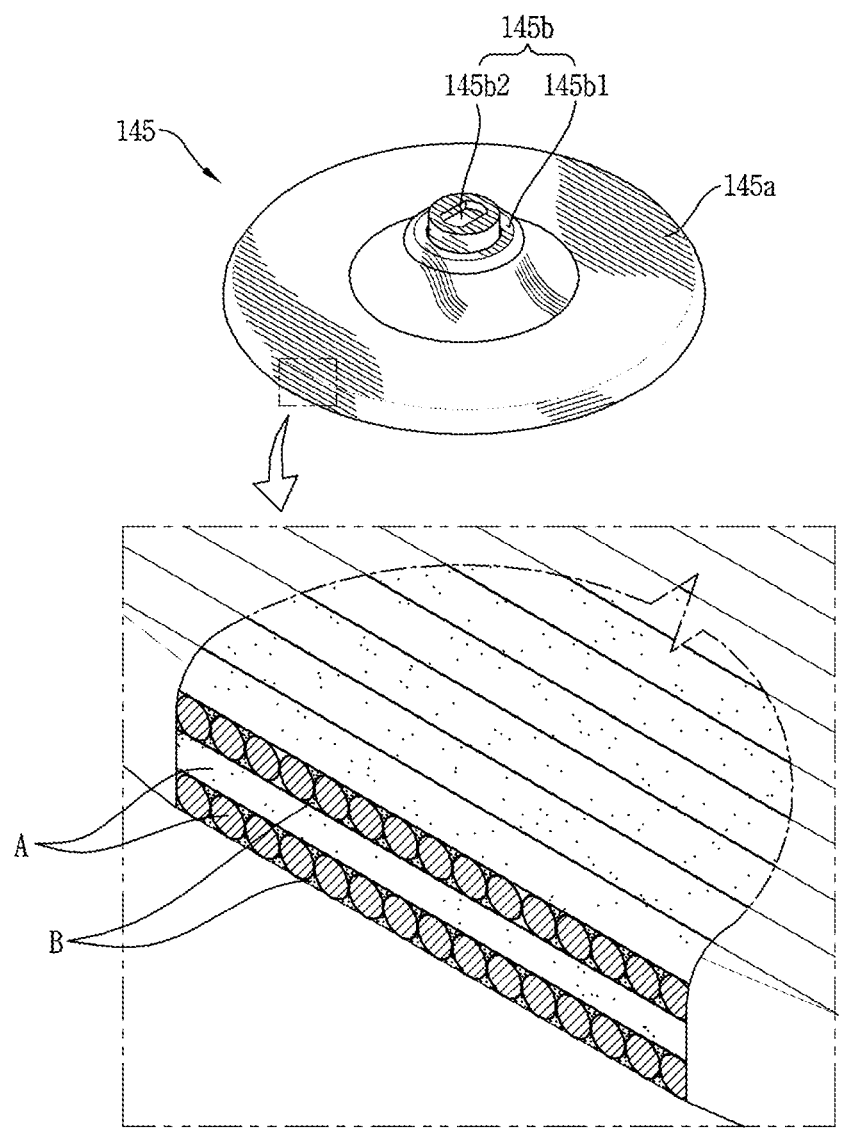
FIG. 7 is a cut perspective view of another embodiment of a discharge valve.

FIG. 4 is a cut perspective view of an embodiment of the discharge valve. FIG. 5 is a planar view of the discharge valve according to FIG. 4 viewed from a rear side. FIG. 6 is a sectional view taken along the line "IV-IV" of FIG. 5. FIG. 7 is a cut perspective view of another embodiment of a discharge valve.

Referring to FIGS. 4 to 6, the discharge valve 145 according to this embodiment includes the valve body portion 145a and the spring coupling portion 145b. The valve body portion 145a is a portion that is detachably attached to the front end surface 141d of the cylinder 141 to open and close the compression space, and the spring coupling portion 145b is a portion extends from a rear surface of the valve body portion 145a (i.e., the front surface) to be coupled to the valve spring 146.

The valve body portion 145a is defined in a shape of a disk. In addition, an avoidance groove 145c having a predetermined width and depth is formed on a center of an opening and closing surface 145a1 of the valve body portion 145a. The avoidance groove 145c is a space into which a head portion of a fastening bolt to couple the suction valve 143 to the piston 142 is inserted. Accordingly, even if the piston 142 moves to a top dead center, it is possible to prevent the fastening bolt fixing the suction valve 143 from colliding with the discharge valve 145. The avoidance groove 145c may be ejected from a mold together with a spring fixing protrusion 145b2 of the spring coupling portion 145b which will be described later.

An outer diameter of the opening and closing surface 145a1 of the valve body portion 145a is larger than an inner diameter of the front end surface 141d of the cylinder 141, which is a valve seating surface, and smaller than or equal to an outer diameter of the front end surface 141d of the cylinder 141. Of course, an outer diameter of the valve body portion 145a may be formed larger than the outer diameter of the front end surface 141d of the cylinder 141. However, in this case, a weight of the discharge valve is increased, and this may result in decreasing the responsiveness of the valve and increasing the collision force and collision noise.

The valve body portion 145a is formed of a reinforced fiber plastic material. As described above, the reinforced fiber plastic material is formed by infiltrating reinforced fiber A with plastic resin B of engineering plastic in a molten state. Accordingly, a rigidity of the valve body portion 145a constituting the discharge valve 145 is improved.

The valve body portion 145a is formed such that the reinforced fiber A has a pattern arranged in a specific direction. For example, the reinforced fiber A may be formed in a pattern interwoven in a lattice shape as illustrated in FIG. 4, or may be formed in a pattern arranged in one direction (Uni-Direction, UD) as illustrated in FIG. 7. Accordingly, the reinforced fiber A in the valve body portion 145a according to this embodiment is arranged horizontally or parallel to the front end surface 141d of the cylinder 141, which is a valve seating surface.

In other words, the reinforced fiber A constituting the valve body portion 145a is not broken into pieces but is arranged long in a transverse direction. For example, the valve body portion 145a may be made of one long reinforced fiber A (a thread) in which the reinforced fiber A is not broken or split in a radial direction on a plane. In addition, even if the reinforced fiber A is cut or split into multiple pieces on a plane as the valve body portion 145a, one reinforced fiber A may account for at least one third of a diameter of a corresponding portion.

Accordingly, the reinforced fiber A is arranged such that each outer circumferential surface of the reinforced fiber A faces the front end surface 141d of the cylinder 141. Then, the discharge valve 145 according to this embodiment can suppress abrasion of the front end surface 141d of the cylinder 141 compared to the discharge valve in which the reinforced fiber A is disorderly distributed.

That is, when the reinforced fiber A is irregularly distributed in the discharge valve, ends of the reinforced fiber A may be arranged in a direction facing the front end surface 141d of the cylinder 141, that is, a direction orthogonal to the front end surface 141d of the cylinder 141. Then, when the discharge valve 145 is closed, sharp ends of the reinforced fiber A having high rigidity collide with the front end surface 141d of the cylinder 141, so that the front end surface 141d of the cylinder 141 may be abraded.

However, when the reinforced fiber A is arranged parallel to the front end surface 141d of the cylinder 141 as in this embodiment, outer circumferential surface of the reinforced fiber A collides with the front end surface 141d of the cylinder 141 when the discharge valve 145 hits the front end surface 141d of the cylinder 141. Accordingly, even if the discharge valve 145 collides with the front end surface 141d of the cylinder 141, an impact force is buffered so that abrasion of the front end surface 141d of the cylinder 141 by the discharge valve 145 can be reduced.

In addition, the valve body portion 145a according to this embodiment has a regular arrangement of the reinforced fiber A as the reinforced fiber A is woven or arranged in one direction. Accordingly, a content of the reinforced fiber A is approximately 50% or more. That is, the content of the reinforced fiber A is significantly high compared to a content of the reinforced fiber A being approximately 30% or less when the reinforced fiber A is irregularly arranged.

As described above, when the content of the reinforced fiber A increases, a weight of the discharge valve 145 decreases. Then, the collision force generated when the discharge valve 145 collides with the front end surface 141d of the cylinder 141 is reduced, so that the abrasion of the cylinder 141 can be further reduced and the collision noise can be reduced.

The spring coupling portion 145b according to this embodiment corresponds to a portion forming the rear surface of the discharge valve 145. Accordingly, the spring coupling portion 145b extends from the rear surface of the valve body portion 145a.

The spring coupling portion 145b includes a spring supporting surface 145b1 extending in a conical shape and a spring fixing protrusion 145b2 extending in a rectangular shape from a center of the spring supporting surface 145b1.

One side surface of the valve spring 146 is supported in an axial direction on the spring supporting surface 145b1, and the spring fixing protrusion 145b2 is inserted into a fixing groove 146a provided in the valve spring 146. Of course, even if the valve spring 146 is a compressed coil spring rather than a leaf spring, the spring supporting surface 145b1 and the spring fixing protrusion 145b2 serve a same role.

In addition, the spring coupling portion 145b according to this embodiment is defined in a single body together with the valve body portion 145a. In this case, the spring coupling portion 145b may be made of a material same as that of the valve body portion 145a. Accordingly, a pattern of the reinforced fiber A included in the spring coupling portion 145b is formed in a shape same as a pattern of the reinforced fiber A included in the valve body portion 145a. That is, the reinforced fiber A included in the spring coupling portion 145b is woven or arranged in one direction, and is formed in a pattern arranged in a direction parallel to the front end surface 141d of the cylinder 141.

Accordingly, a content of the reinforced fiber A in the spring coupling portion 145b also increases, and this may result in reducing a weight of the spring coupling portion 145b. Then, as the weight of the discharge valve 145 decreases as a whole, the collision force with the front end surface 141d of the cylinder 141 decreases. Then, it is possible to reduce the collision noise while reducing abrasion of the front end surface 141d of the cylinder 141.

Meanwhile, in the discharge valve 145 according to this embodiment, the valve body portion 145a and the spring coupling portion 145b may be compression molded at the same time.

Figure 8A:
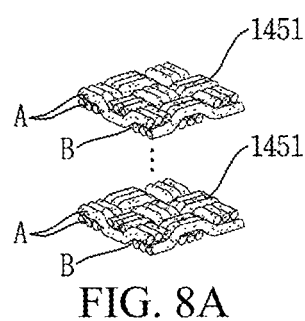
FIGS. 8A to 8D are schematic views and FIG. 9 is a block diagram illustrating a process of fabricating a discharge valve in accordance with an embodiment of the present disclosure.
Figure 8B:
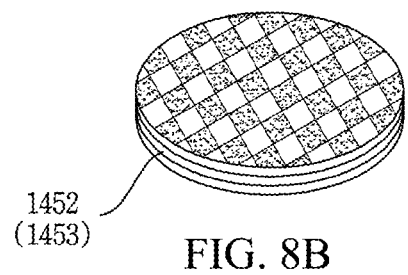
Figure 8D:
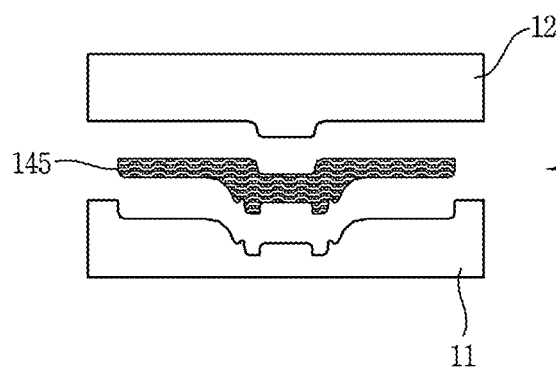
Figure 8C:
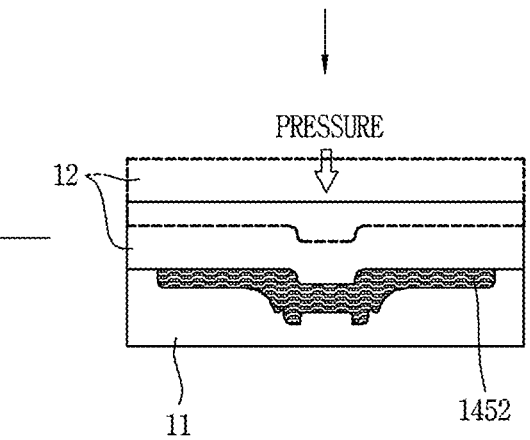
Figure 9:
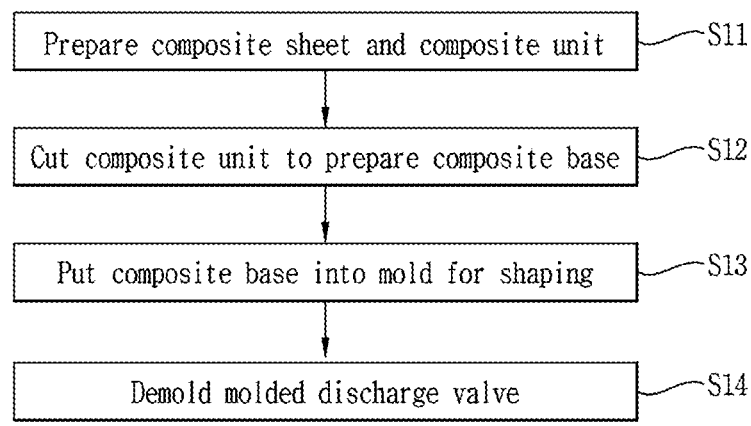

FIGS. 8A to 8D are schematic views and FIG. 9 is a block diagram illustrating a process of fabricating the discharge valve according to this embodiment. Hereinafter, a process of fabricating the discharge valve will be described with reference to an example in which reinforced fiber is woven. However, even when the reinforced fiber is arranged in one direction, the process can be performed in a manner same as the above.

Firstly, as illustrated in FIG. 8A and S11 of FIG. 9, resin B is impregnated into a fabric in which the reinforced fiber A is woven to prepare a composite sheet 1451, and a plurality of composite sheets 1451 is sequentially stacked to prepare a composite unit 1452. Here, the reinforced fiber A of each composite sheet 1451 is extended in the radial direction without breaking and is arranged to be parallel to the front end surface 141d of the cylinder 141.

Next, as illustrated in FIG. 8B and S12 of FIG. 9, the composite unit 1452 is cut to fit a size of a cavity (not shown) provided in a mold of the composite unit 1452 to cut a composite base 1453.

Next, as illustrated in FIG. 8C and S13 of FIG. 9, the composite base 1453 is put into molds 11 and 12 to perform compression molding. Here, the composite base 1453 is arranged so as to be perpendicular to a direction in which a lengthwise direction of the reinforced fiber A is shaped, that is, a direction in which a first mold 11 and a second mold 12 are pressed. Further, during the compression molding, a molding temperature is approximately 360° C. or higher and a molding pressure is about 30 kgf/cm² or higher.

Next, as illustrated in FIG. 8D and S14 of FIG. 9, when the molding operation is completed after performing the molding operation for a preset time at the above-described temperature and pressure, the molds 11 and 12 are separated. Then, the discharge valve is demolded from the molds to complete a fabrication of the discharge valve.

Figure 10:
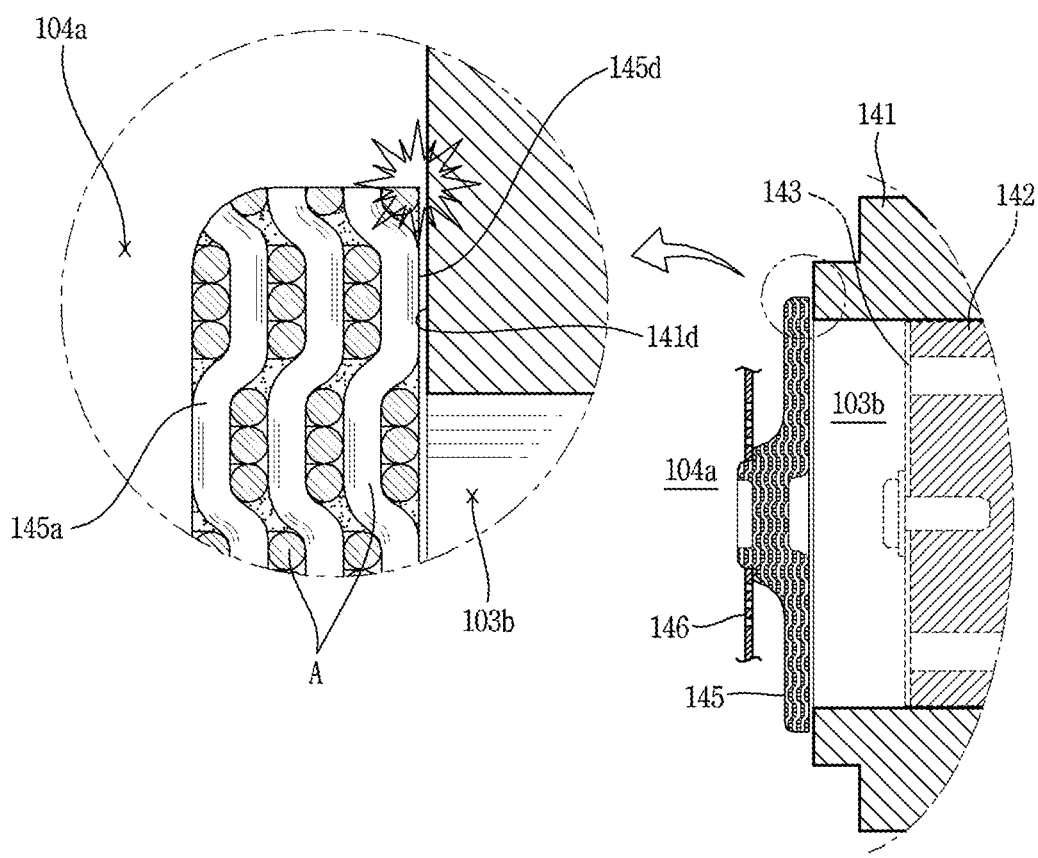
FIG. 10 is a schematic view illustrating operation effects of a discharge valve in accordance with an embodiment of the present disclosure.

FIG. 10 is a schematic view illustrating operation effects of the discharge valve according to this embodiment.

Referring to FIG. 10, as the discharge valve 145 according to this embodiment includes plastic resin B having high heat resistance, such as engineering plastic, heat resistance of the discharge valve 145 may be improved. Accordingly, even if the discharge valve 145 is exposed for a long time in the discharge space 104a that is in a high temperature and high pressure state, deformation of the discharge valve 145 due to high temperature and high pressure can be suppressed.

In addition, as the discharge valve 145 according to this embodiment includes reinforced fiber A having high abrasion resistance, deformation or abrasion occurred while the discharge valve 145 is opening and closing can be suppressed. That is, as the discharge valve 145 is supported by the valve spring 146, the discharge valve 145 opens and closes the compression space 103b of the cylinder 141 while reciprocating by a pressure difference between the compression space 103b and the discharge space 104a and the restoring force (elastic force) of the valve spring 146. At this time, the discharge valve 145 strongly collides with the front end surface 141d of the cylinder 141 during a closing process, and the discharge valve 145 may be deformed or abraded to be damaged by the collision force. However, since the discharge valve 145 includes reinforced fiber A as described above, deformation or abrasion of the discharge valve 145 can be suppressed even if the discharge valve 145 strongly collides with the cylinder 141.

In addition, in the discharge valve 145 according to this embodiment, as the reinforced fiber A is arranged parallel to the front end surface 141d of the cylinder 141, abrasion of the front end surface 141d of the cylinder 141 can be suppressed. That is, in the discharge valve 145 including reinforced fiber A with high abrasion resistance, the front end surface 141d of the cylinder 141 may be abraded when the discharge valve 145 collides with the front end surface 141d of the cylinder 141.

In particular, when the reinforced fiber A is arranged in a colliding direction, sharp ends of the reinforced fiber A scratch the front end surface 141d of the cylinder 141, and accordingly abrasion of the cylinder 141 may be greater. However, when the reinforced fiber A is arranged parallel to the front end surface 141d of the cylinder 141 as in this embodiment, abrasion of the cylinder 141 can be suppressed as the outer circumferential surface of the reinforced fiber A with relatively smooth curves collides with the front end surface 141d of the cylinder 141.

In addition, as described above, as the reinforced fiber A is regularly arranged, the content of the reinforced fiber is increased compared to irregular arrangements, thereby reducing the weight of the valve and reducing an amount of impact. In this manner, abrasion of the cylinder can be suppressed and at the same time the collision noise can be reduced.

Under identical conditions, an abrasion amount of the cylinder is 150 μm when the reinforced fiber is irregularly arranged, but it is 10 μm when the reinforced fiber is regularly arranged as in this embodiment. Accordingly, abrasion due to collision with the cylinder occurred when the discharge valve is opened and closed is greatly reduced.

In addition, in the discharge valve according to this embodiment, noise generated while the discharge valve is closing is reduced by about 3 dB. It can be seen that in this embodiment, as the content of the reinforced fiber increases, the weight of the discharge valve decreases, and collision noise due to collision with the cylinder occurred while the discharge valve is opening and closing is reduced.

In addition, it can be seen that the discharge valve according to this embodiment is enhanced in the responsiveness of the valve due to the weight reduction of the discharge valve, therefore efficiency of the compressor is improved by approximately 2% compared to irregular arrangement of the reinforced fiber.

The fabricating method of the discharge valve and operation effects thereof as described above is similarly applied also in a case where the reinforced fiber A has a pattern arranged in one direction. Therefore, detailed description thereof will be replaced by the description of the woven discharge valve described above.

However, as illustrated in FIG. 7, when the reinforced fiber A is arranged in one direction, the reinforced fiber A is more uniformly and densely arranged than in the lattice shape illustrated in FIG. 4. Accordingly, the content of the reinforced fiber A is further increased so that the weight of the discharge valve 145 is further reduced. Then, the above-described collision force with cylinder and the resulting abrasion and collision noise of the cylinder can be further reduced.

Hereinafter, description will be given of another embodiment of a discharge valve.

That is, in the above-described embodiment, the valve body portion and the spring coupling portion constituting the discharge valve are made of a composite of identical type, but in this embodiment, a valve body portion and a spring coupling portion are made of a composite of different types.

Figure 11:
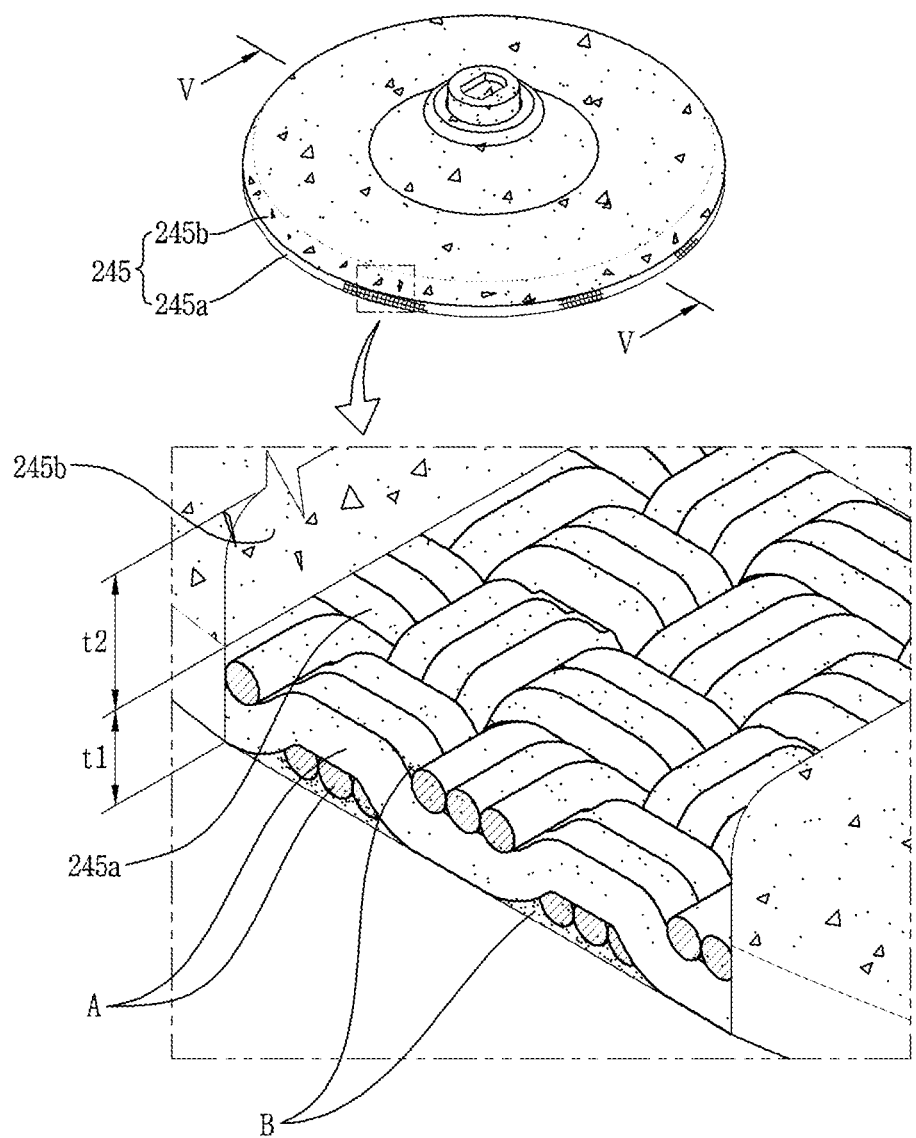
FIG. 11 is a perspective view illustrating still another example of a discharge valve.
Figure 12:
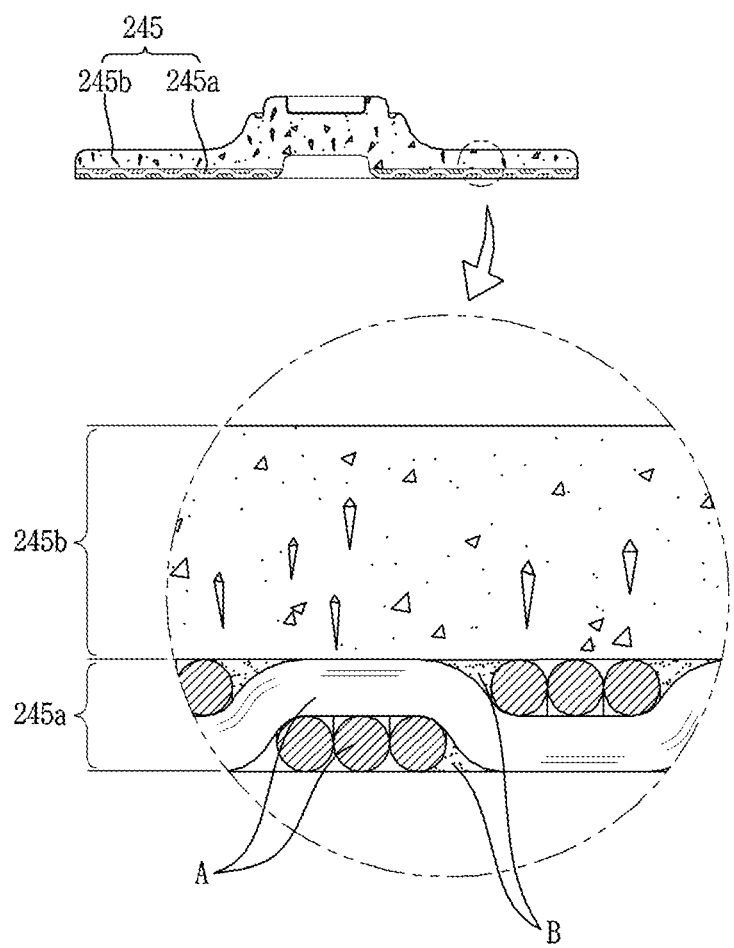
FIG. 12 is a sectional view taken along the line "V-V" of FIG. 11.

FIG. 11 is a perspective view illustrating still another example of a discharge valve, and FIG. 12 is a sectional view taken along the line "V-V" of FIG. 11.

Referring to FIGS. 11 and 12, a discharge valve 245 according to this embodiment includes a valve body portion 245a and a spring coupling portion 245b made of composites of different types.

The valve body portion 245a may be defined in a shape of a disk. For example, the valve body portion 245a may be formed by weaving reinforced fiber A1 or by arranging the reinforced fiber A1 in one direction. Accordingly, the valve body portion 245a can increase abrasion resistance to an opening and closing surface 245a1 of the discharge valve 245 while the discharge valve 245 is opening and closing, and suppress abrasion against the front end surface 141d of the cylinder 141.

Reinforced fiber A2 in the spring coupling portion 245b may be arranged in an irregularly distributed manner, not as the valve body portion 245a in which the reinforced fiber A2 is regularly arranged. For example, the reinforced fiber A2 included in the spring coupling portion 245*b* may be arranged in a direction orthogonal to the reinforced fiber A1 included in the valve body portion 245*a*, that is, a direction orthogonal to the front end surface 141*d* of the cylinder 141.

Here, a separate composite sheet (second composite sheet) forming the spring coupling portion 245*b* may be stacked on a composite sheet (first composite sheet) forming the valve body portion 245*a*. For this purpose, the second composite sheet may be formed by impregnating plastic resin B into the reinforced fiber A2 that is irregularly distributed. The second composite sheet is stacked on the first composite sheet to form a composite unit, and the composite unit is cut to fit a mold to form a composite base. Thereafter, as described above with reference to FIGS. 8A to 9, the discharge valve 245 as in this embodiment can be fabricated by performing compression molding on the composite base in the mold.

As described above, when the valve body portion 245*a* and the spring coupling portion 245*b* are formed of different types of composites, basic operation effects thereof are similar to the operation effects of the above-described embodiment. However, in this embodiment, the composite sheet of the spring coupling portion 245*b* can be easily fabricated, thereby simplifying an entire fabricating process of the discharge valve 245. That is, when same number (thickness) of composite sheets are included in the discharge valve 245, a thickness t1 of the valve body portion 245*a* in which composite sheets are fabricated in a relatively difficult manner can be formed thin, whereas a thickness t2 of the spring coupling portion 245*b* in which composite sheets are fabricated in a relatively easy manner can be formed thick. Then, when fabricating the discharge valve 245, a process time put into the composite sheet as a whole can be shortened, and accordingly the fabricating process is simplified.

In addition, material costs can be reduced in the discharge valve 245 according to this embodiment. That is, in the above-described embodiment, it is not easy to utilize by-product generated in the process of cutting the composite unit. However, in this embodiment, by-product generated after cutting the composite unit can be used to form the spring coupling portion 245*b* by crushing the by-product into fine pieces.

For example, the by-product is finely crushed, then shaped in an appropriate shape and size to form a second composite base. Then, in the mold, the second composite base is placed on a rear surface of the first composite base forming the valve body portion 245*a*, and press-molded with high temperature and high pressure as described above. Accordingly, the second composite base is welded to the first composite base.

Even in this case, a fabricating process of the second composite base is simpler than that of the first composite base. Therefore, a fabricating time of the discharge valve 245 as a whole can be reduced, and therefore, a fabricating cost can be reduced.

Also, in this case, when the first composite base is formed thinner than the second composite base, abrasion of the front end surface 141*d* of the cylinder 141 by the discharge valve 245 can be minimized and simultaneously the entire fabricating time of the discharge valve 245 can be further reduced.

Hereinafter, description will be given of still another embodiment of a discharge valve according to the present disclosure. In the above-described embodiments, the valve body portion and the spring coupling portion constituting the discharge valve are compression molded together. However, in this embodiment, a valve body portion and a spring coupling portion are assembled to be coupled.

Figure 13:
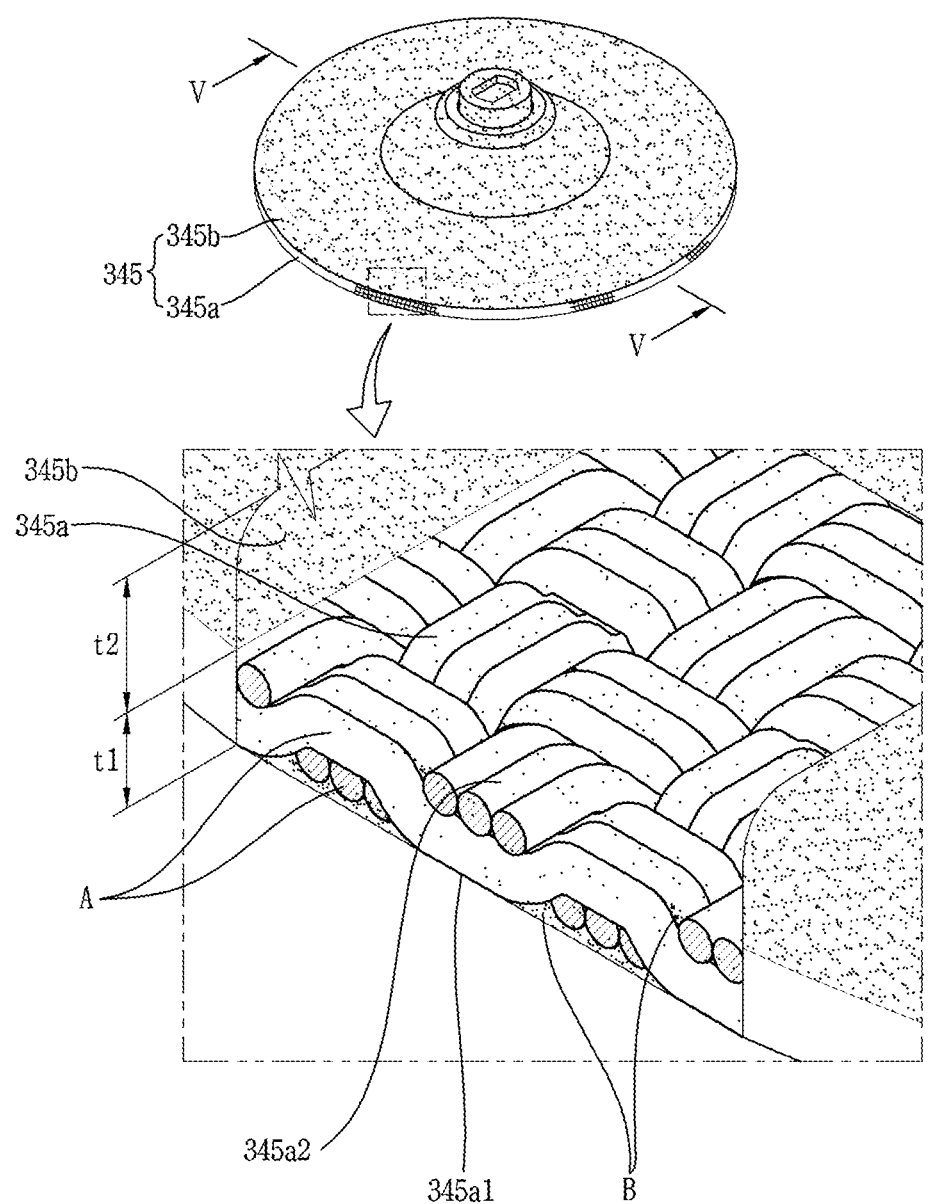
FIG. 13 is a perspective view illustrating still another example of a discharge valve.
Figure 14:
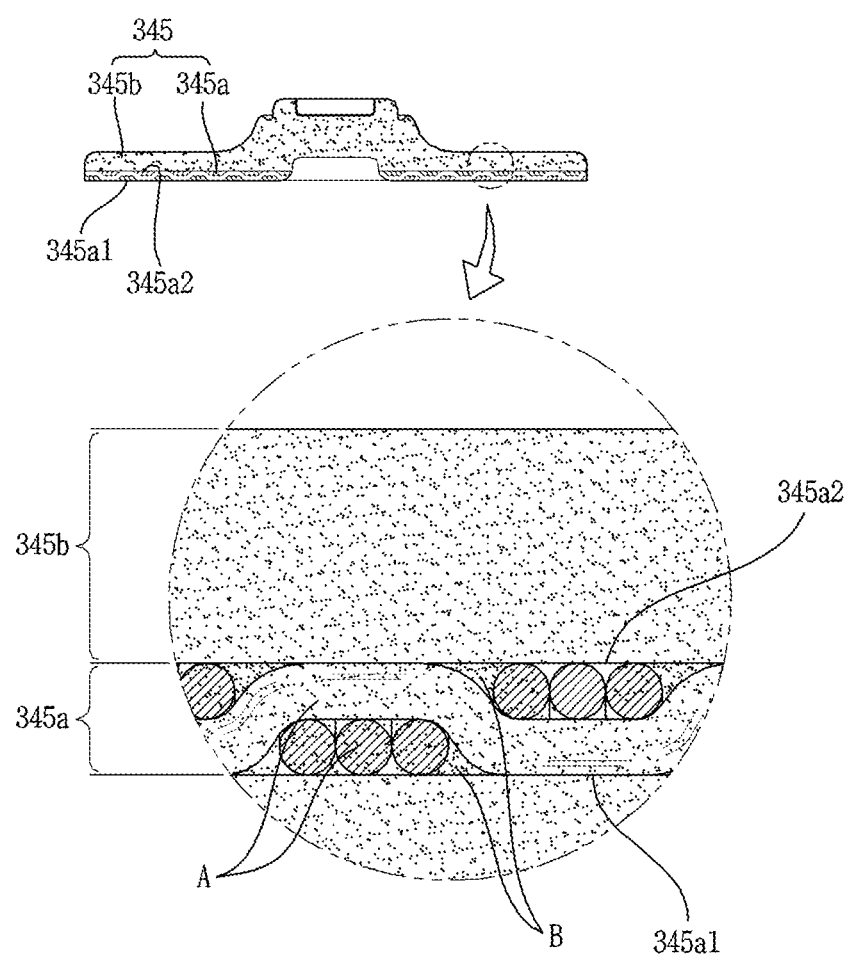
FIG. 14 is a sectional view taken along the line "VI-VI" of FIG. 13.

FIG. 13 is a perspective view illustrating still another example of a discharge valve, and FIG. 14 is a sectional view taken along the line "VI-VI" of FIG. 13.

Referring to FIGS. 13 and 14, a discharge valve 345 according to this embodiment includes a valve body portion 345*a* and a spring coupling portion 345*b* coupled to the valve body portion 345*a*.

The valve body portion 345*a* may be defined in a shape of a disk as in the embodiment illustrated in FIG. 4 above. For example, the valve body portion 345*a* may be formed of a reinforced fiber composite in which reinforced fiber A is woven or a reinforced fiber composite in which reinforced fiber A is arranged in one direction. Accordingly, the valve body portion 345*a* can increase abrasion resistance to an opening and closing surface 345*a*1 of the discharge valve 345 while the discharge valve 345 is opening and closing, and simultaneously suppress abrasion against the front end surface 141*d* of the cylinder 141.

The spring coupling portion 345*b* may be coupled to the valve body portion 345*a*. For example, the spring coupling portion 345*b* is defined substantially in a shape of a disk like the valve body portion 345*a*, and a coupling surface 345*b*1 of the spring coupling portion 345*b* facing the valve body portion 345*a* may be bonded using an adhesive or welded to a rear surface 345*a*2 of the valve body portion 345*a*. In this case, the spring coupling portion 345*b* may be post-assembled in a state pre-fabricated in a shape of a disk using a separate mold as illustrated in FIGS. 11 and 12 described above.

Alternatively, the spring coupling portion 345*b* may be coupled to the valve body portion 345*a* by insert molding. For example, the spring coupling portion 345*b* may be formed by injecting melt solution into a mold in a state where the valve body portion 345*a* is inserted into the mold.

Here, an outer diameter of the valve body portion 345*a* may be formed larger than an outer diameter of the spring coupling portion 345*b*. To this end, an inner diameter of a second molding space of the second mold 12 (see FIGS. 8A to 8D) may be slightly smaller than an inner diameter of a first molding space of the first mold 11 (see FIG. 1). For example, the first molding space is defined in a disk shape so that the valve body portion 345*a* is inserted thereinto, and the second molding space is defined in a substantially hemispherical shape so that the spring coupling portion 345*b* is shaped therein.

Here, since the inner diameter of the second molding space is slightly smaller than the inner diameter of the first molding space, a stepped surface (not shown) is generated on a mating surface of the second mold 12 contacting the first molding space. When the first mold 11 and the second mold 12 are joined, a rim of a rear surface of the valve body portion 345*a* is supported by the stepped surface.

Then, melt solution injected into the second molding space is suppressed from seeping into the first molding space, thereby suppressing an inflow of the melt solution forming the spring coupling portion 345*b* to the opening and closing surface 345*a*1 of the valve body portion 345*a*.

Accordingly, the opening and closing surface 345*a*1 of the valve body portion 345*a* ensures high rigidity, so that abrasion in collision between the opening and closing surface 345*a*1 of the valve body portion 345*a* and the front end surface 141*d* of the cylinder 141 can be prevented.

In this case, the opening and closing surface 345*a*1 of the valve body portion 345*a* contains reinforced fiber so that the opening and closing surface 345a1 of the valve body portion 345a has high rigidity. Even in this case, as the reinforced fiber contained in the opening and closing surface 345a1 of the valve body portion 345a is arranged parallel to the front end surface 141d of the cylinder 141, round outer circumferential surface of the reinforced fiber contained in the opening and closing surface 345a1 of the valve body portion 345a collides with the front end surface 141d of the cylinder 141 while the discharge valve is closing. However, due to the above configuration, abrasion of the front end surface 141d of the cylinder 141 can be suppressed.

Figure 15:
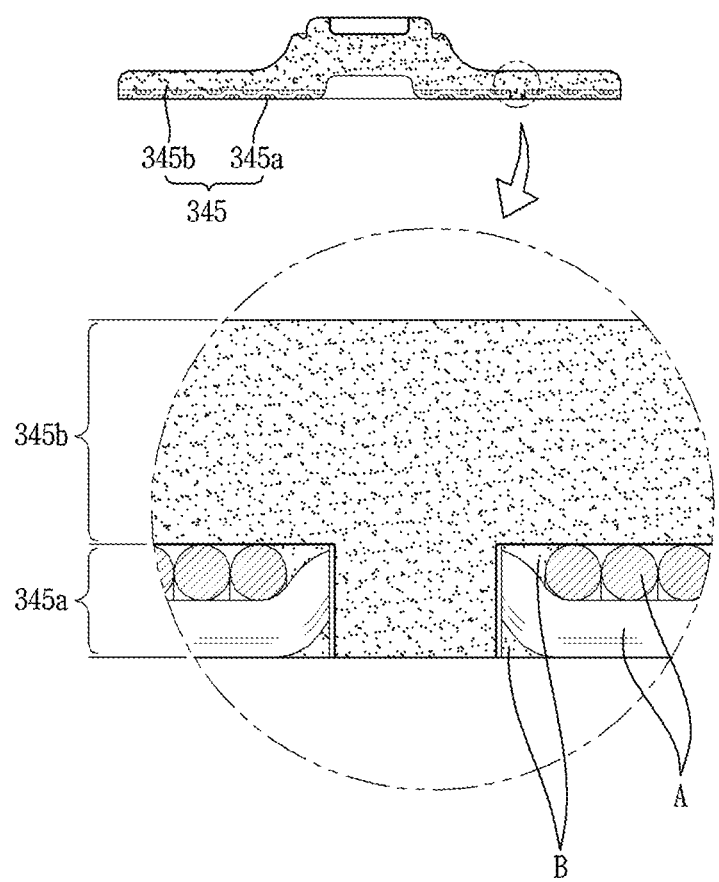
FIG. 15 is a sectional view illustrating a variation of the discharge valve in FIG. 13.

In addition, when assembling to couple the valve body portion 345a and the spring coupling portion 345b as in this embodiment, it is preferable that a fixing portion is provided between the valve body portion 345a and the spring coupling portion 345b. FIG. 15 is a sectional view illustrating a variation of the discharge valve in FIG. 13.

Referring to FIG. 15, at least one or more fixing grooves or fixing holes 345a3 are formed in the valve body portion 345a, and fixing protrusions 345b2 inserted into the fixing grooves or fixing holes 345a3 of the valve body portion 345a may be formed on the spring coupling portion 345b.

Here, in a structure in which the valve body portion 345a and the spring coupling portion 345b are coupled in a bonded manner, fixing grooves or fixing holes (not shown) may be provided in the spring coupling portion 345b and fixing protrusions (not shown) may be provided on the valve body portion 345a. However, in a structure in which the valve body portion 345a and the spring coupling portion 345b are coupled by insert molding, it is preferable that the fixing grooves or the fixing holes 345a3 are formed in the valve body portion 345a.

Figure 16A:
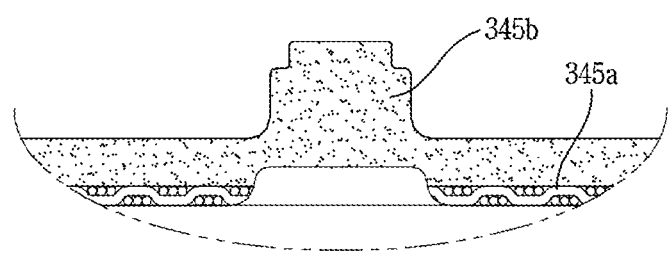
FIGS. 16A to 16C are sectional views illustrating variations of the discharge valve in FIG. 13.
Figure 16B:
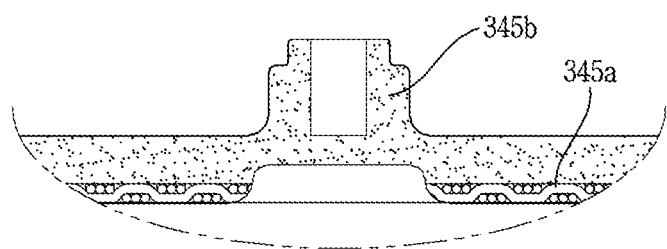
Figure 16C:
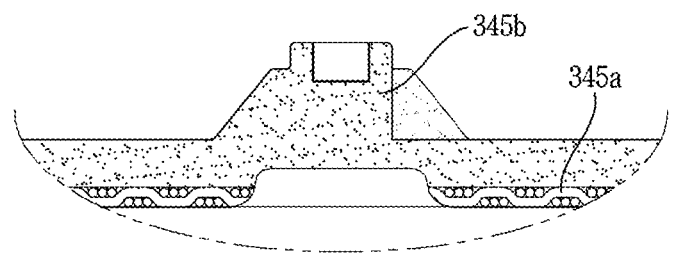

As described above, when the valve body portion 345a and the spring coupling portion 345b are post-assembled, basic operation effects thereof are similar to the operation effects of the above-described embodiment. However, in this embodiment, as the valve body portion 345a and the spring coupling portion 345b are post-assembled, the spring coupling portion 345b can be formed in various shapes. FIGS. 16A to 16C are sectional views illustrating variations of the discharge valve in FIG. 13.

For example, the spring coupling portion 345b may be formed in a rod shape as in FIG. 16A, or a ring shape as in FIG. 16B, or a rib shape as in FIG. 16C, rather than being formed in the hemispherical shape described above. In this case, the outer diameter of the spring coupling portion 345b may be significantly smaller than the outer diameter of the valve body portion 345a, or a volume of the spring coupling portion 345b may be minimized. Then, the discharge valve 345 can be made lighter to increase the responsiveness of the valve while reducing the amount of impact between the discharge valve and the cylinder 141.

In addition, in this embodiment, a material of the spring coupling portion 345b may be different from that of the valve body portion 345a. That is, since the spring coupling portion 345b is formed of a material same as that of the valve body portion 345a in the above-described embodiments, fabricating cost of the discharge valve 345 may be increased as a whole or durability improvement may be limited.

However, in this embodiment, the spring coupling portion 345b can be formed in various ways as needed. For example, the spring coupling portion 345b may be formed only of plastic resin excluding reinforced fiber. In this manner, the fabricating cost of the discharge valve can be reduced.

Further, in this embodiment, the spring coupling portion 345b may be formed of metal. In this case, a durability of the discharge valve 345 can be further improved. In addition, in the discharge valve 345 according to this embodiment, as the reinforced fiber A of the opening and closing surface 345a1 of the valve body portion 345a contacting the front end surface 141d of the cylinder 141 is arranged in parallel to the front end surface 141d of the cylinder 141, abrasion of the front end surface 141d of the cylinder 141 can be suppressed even in collision with the front end surface 141d of the cylinder 141.

Hereinafter, description will be given of still another embodiment of a discharge valve. That is, the valve body portion is defined in a disk shape in the above-described embodiments, but a valve body portion is defined in an annular shape in this embodiment.

Figure 17:
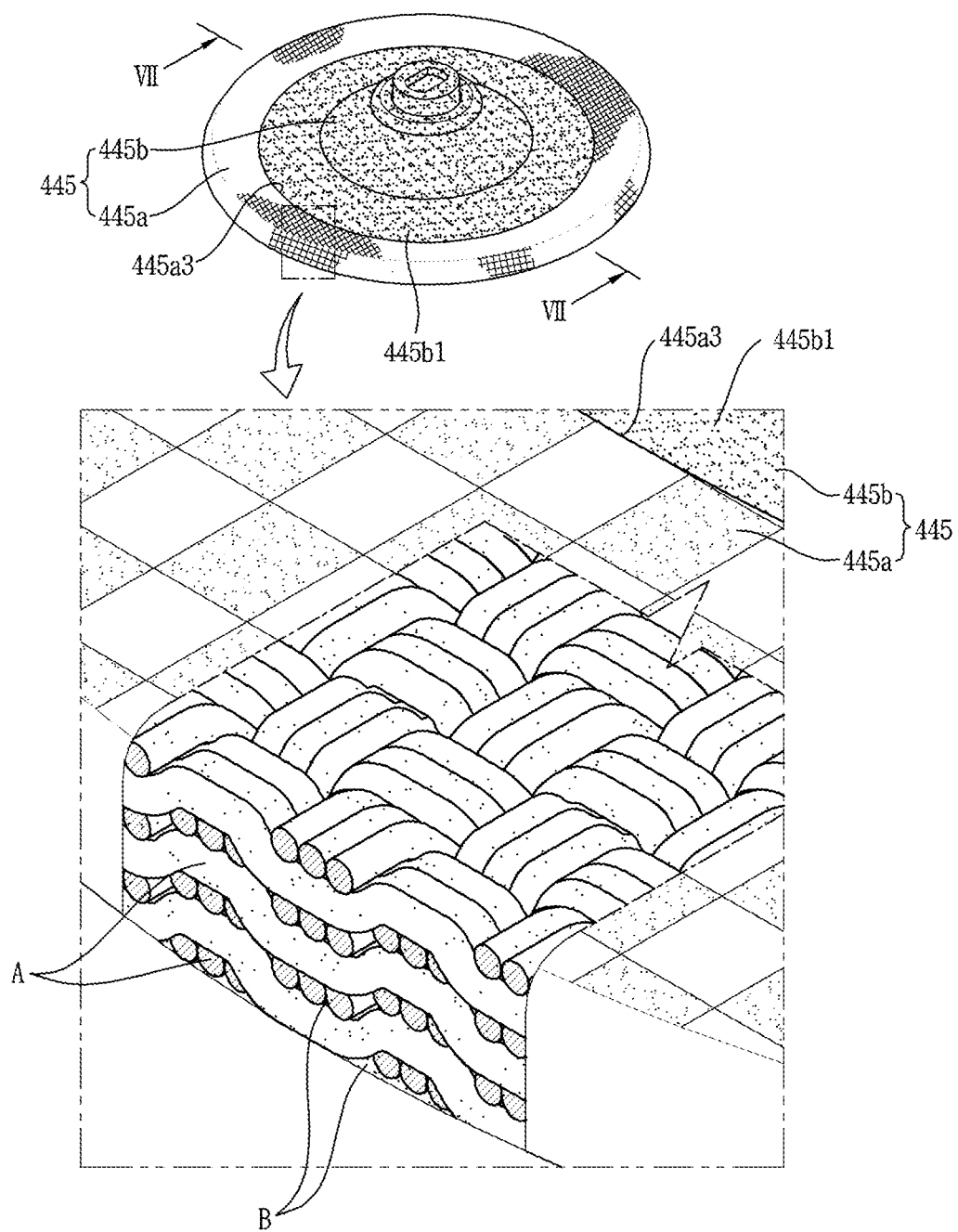
FIG. 17 is a perspective view illustrating still another example of a discharge valve.
Figure 18:
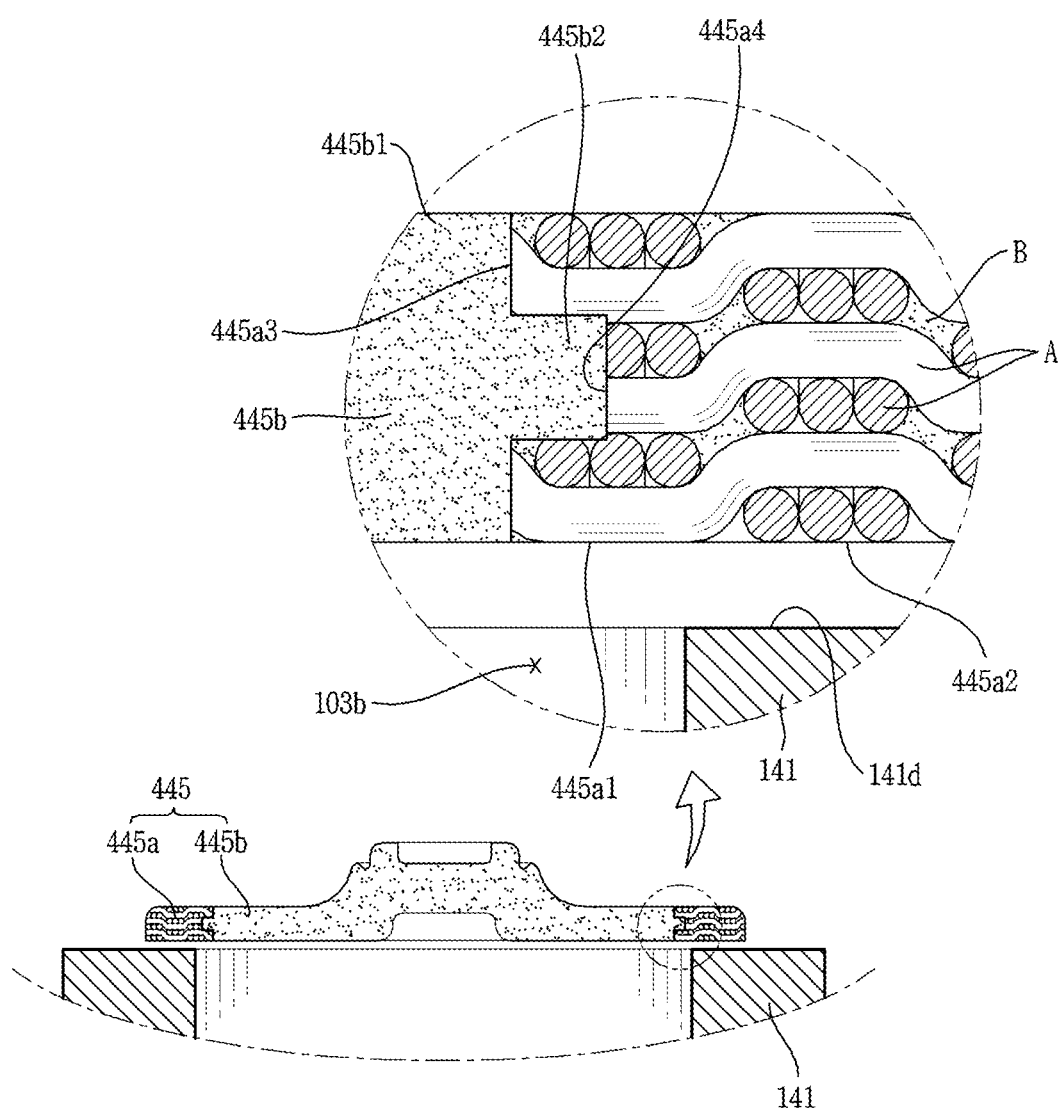
FIG. 18 is a sectional view taken along the line "VII-VII" of FIG. 17.
Figure 19:
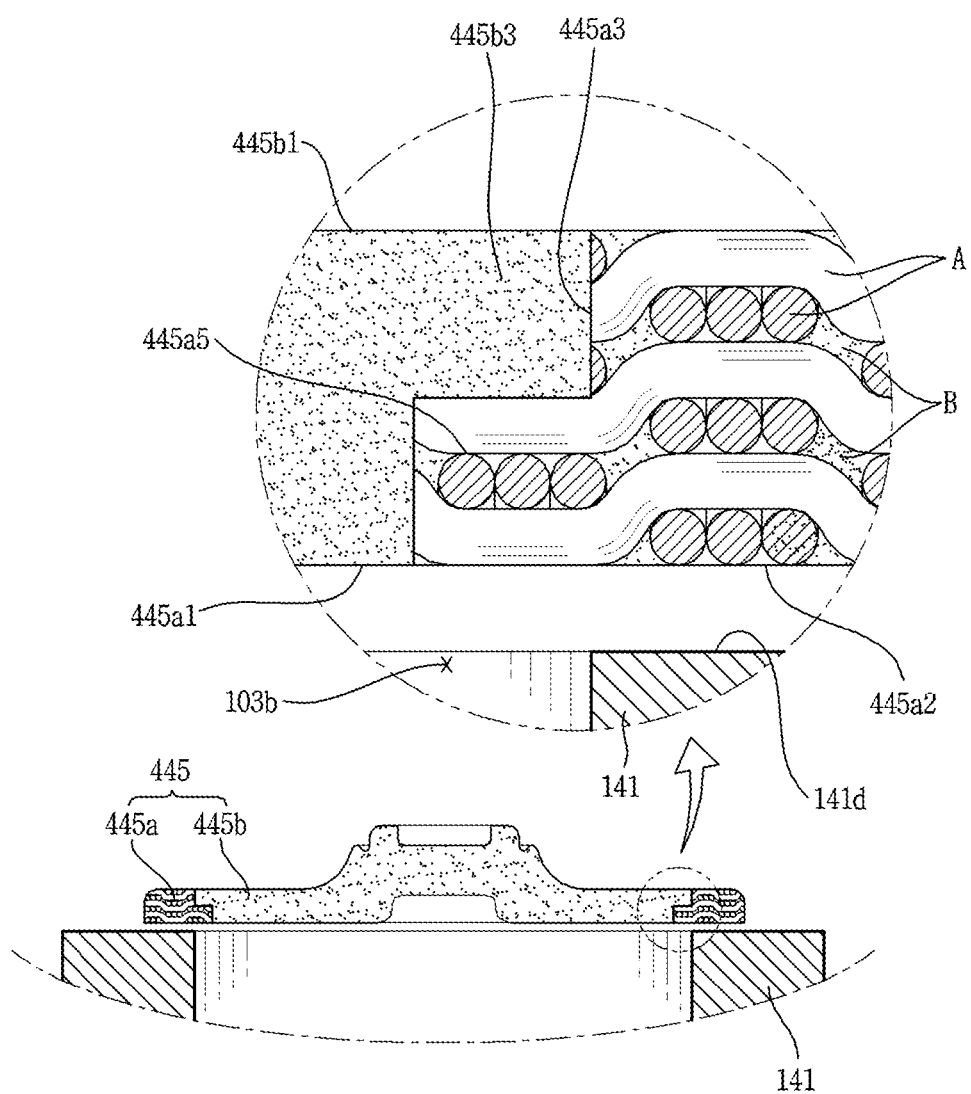
FIG. 19 is a sectional view illustrating a variation of a fixing portion in FIG. 18.

FIG. 17 is a perspective view illustrating still another example of a discharge valve, FIG. 18 is a sectional view taken along the line "VII-VII" of FIG. 17, and FIG. 19 is a sectional view illustrating a variation of a fixing portion in FIG. 18.

Referring to FIGS. 17 to 19, a discharge valve 445 according to this embodiment includes a valve body portion 445a constituting an opening and closing surface 445a1 and a spring coupling portion 445b coupled to the valve body portion 445a and to which the valve spring 146 is coupled.

The valve body portion 445a, as described above, may be formed of a reinforced fiber composite in which reinforced fiber A is woven or formed of a reinforced fiber composite in which reinforced fiber A is arranged in one direction. Accordingly, the valve body portion 445a can increase abrasion resistance to an opening and closing surface of the discharge valve 445 while the discharge valve is opening and closing, and simultaneously suppress abrasion against the front end surface 141d of the cylinder 141.

However, the opening and closing surface 445a1 of the discharge valve 445 in this embodiment does not need to be entirely formed of a reinforced fiber composite. For example, it is sufficient if only a sealing surface portion 445a2 contacting the front end surface 141d of the cylinder 141 in the opening and closing surface 445a1 of the discharge valve 445 is formed of a reinforced fiber composite.

Thus, the valve body portion 445a according to this embodiment may be defined in an annular shape with a hollow portion 445a3 in its center. Here, it is preferable that an inner diameter of the valve body portion 445a is larger than an inner diameter of the cylinder 141. Of course, the inner diameter of the valve body portion 445a may be same as or slightly smaller than the inner diameter of the cylinder 141. However, considering the structure in which the discharge valve 445 reciprocates by the valve spring 146, it is preferable that the inner diameter of the valve body portion 445a is slightly larger than the inner diameter of the cylinder 141 to ensure durability of the discharge valve 445 in case of collision with cylinder 141.

The spring coupling portion 445b may be separately fabricated and bonded to be post-assembled as illustrated in the embodiments of FIGS. 13 and 14 or may be post-assembled by insert molding. For example, a coupling protrusion 445b1 is formed on a center of a rear surface of the spring coupling portion 445b, and the coupling protrusion 445b1 of the spring coupling portion 445b is inserted into the hollow portion 445a3 of the valve body portion 445a.

Here, the fixing portion may be provided between the valve body portion 445a and the spring coupling portion 445b. The fixing portion may be defined in an uneven shape or a stepped shape.

For example, as illustrated in FIG. 18, a fixing groove 445a4 may be formed on an inner circumferential surface of the hollow portion 445a3 of the valve body portion 445a, and a fixing protrusion 445b2 may be formed on an outer circumferential surface of the coupling protrusion 445b1 of the spring coupling portion 445b. Accordingly, the valve body portion 445a can be firmly coupled to the spring coupling portion 445b.

Alternatively, as illustrated in FIG. 19, a first fixed end 445a5 may be formed on an inner circumferential surface of the hollow portion 445a3 of the valve body portion 445a, and a second fixed end 445b3 engaged with the first fixed end 445a5 may be formed on an outer circumferential surface of the coupling protrusion 445b1 of the spring coupling portion 445b. Accordingly, the valve body portion 445a can be firmly coupled to the spring coupling portion 445b.

However, as illustrated in FIG. 19, when the fixing portion is defined in a stepped shape, it is preferable that the fixing portion is formed to generate a supporting force in a direction facing the cylinder 141. That is, as the rear surface of the discharge valve (the front surface) is elastically supported by the valve spring 146, a load on the fixing portion does not significantly increase in an opening operation of the discharge valve 445. However, in a closing operation of the discharge valve 445, the fixing portion is subjected to a large load due to the elastic force (restoring force) of the valve spring 146. Therefore, in order to withstand the load due to the valve spring 146 in the closing operation of the discharge valve 445, it may be preferable that a supporting direction of the fixing portion is formed in a direction toward the cylinder 141.

In addition, the spring coupling portion 445b according to this embodiment may be formed of various materials. For example, the spring coupling portion 445b may be formed of a woven composite material as illustrated in FIG. 4 or formed of a composite arranged in one direction. However, considering that the spring coupling portion 445b does not directly contact the cylinder 141 and is fabricated separately from the valve body portion 445a and post-assembled, the spring coupling portion 445b may be formed of a composite in which reinforced fiber A is irregularly arranged as in the embodiments of FIGS. 11 and 12 or may be formed of a plastic resin or metal from which reinforced fiber A is excluded as in the embodiments of FIGS. 13 and 14.

As described above, when the valve body portion 445a is defined in an annular shape, the valve body portion 445a and the spring coupling portion 445b are post-assembled. Therefore, basic operation effects according to this embodiment are similar to the operation effects in the embodiments illustrated in FIGS. 13 and 14 described above.

However, in this embodiment, as the valve body portion 445a is defined in an annular shape, an area of the valve body portion 445a can be further reduced, and accordingly, a fabricating cost of the discharge valve 445 can be further reduced.

Figure 20:
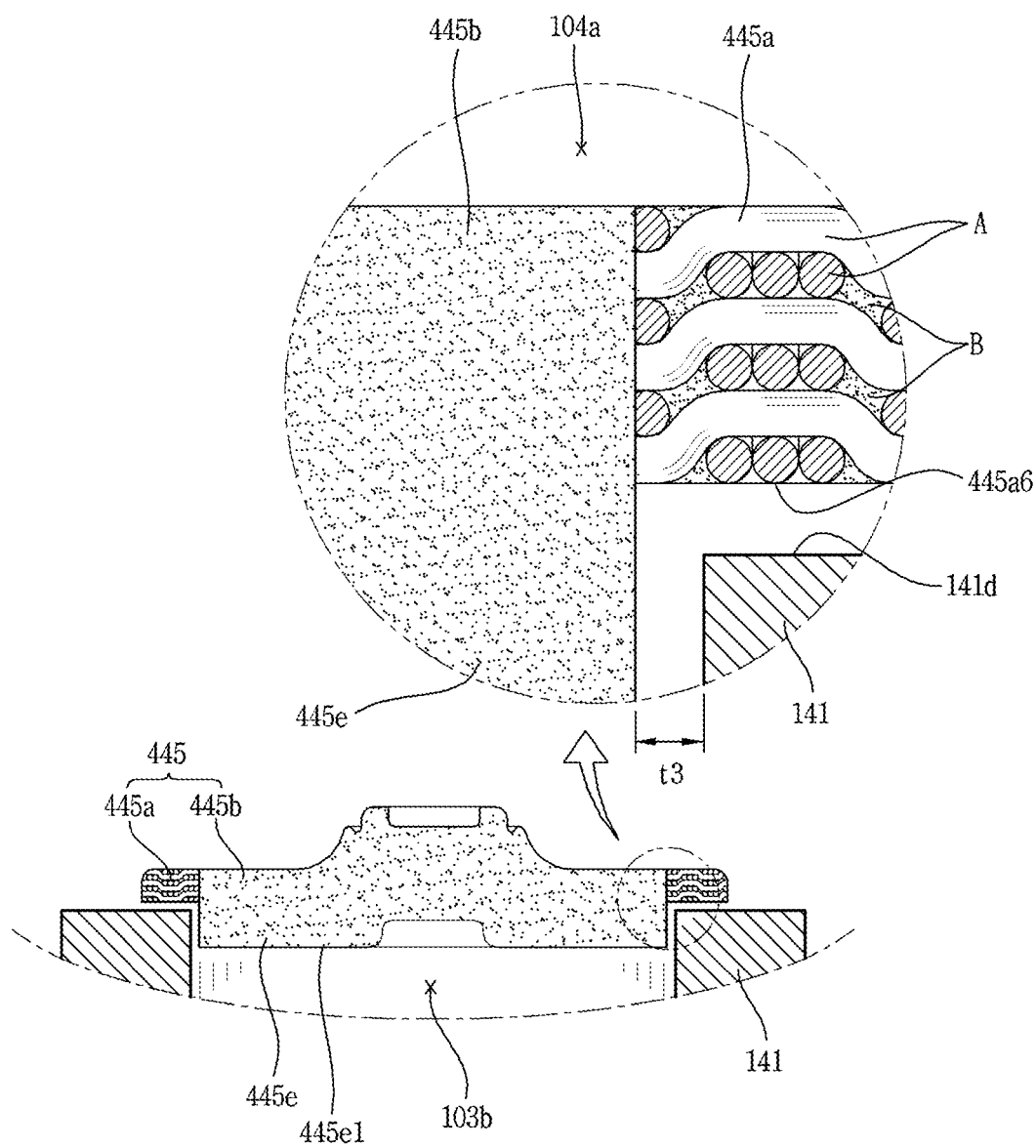
FIG. 20 is a sectional view illustrating a variation of the discharge valve in FIG. 17.

In addition, in other embodiments including the embodiments illustrated in FIGS. 13 and 14 described above, a height of the opening and closing surface is formed evenly, but in this embodiment, a height of a second opening and closing surface may be formed higher than a height of a first opening and closing surface. FIG. 20 is a sectional view illustrating a variation of the discharge valve in FIG. 17.

Referring to FIG. 20, a first opening and closing surface 445a6 detachable from the front end surface 141d of the cylinder 141 may be provided on the valve body portion 445a, and a second opening and closing surface 445e1 not contacting the front end surface 141d of the cylinder 141 but opening and closing the compression space 103b of the cylinder 141 may be provided on the spring coupling portion 445b.

Here, the spring coupling portion 445b may have a guide protrusion 445e extending in a rod shape toward the cylinder 141 from a center of the rear surface of the spring coupling portion 445b, and the second opening and closing surface 445e1 described above may be provided on a rear surface of the guide protrusion 445e. In this case, it may be preferable that a height of the guide protrusion 445e is longer than a distance in which the discharge valve 445 is moving in the opening and closing operation.

Accordingly, even when the discharge valve 445 is in the opening operation, the second opening and closing surface 445e1 is positioned inside the cylinder 141. In this manner, the guide protrusion 445e acts as a kind of guide as sliding on the inner circumferential surface of the cylinder 141 while the discharge valve 445 is opening and closing, and thus the first opening and closing surface 445a1 can be in close contact with the front end surface 141d of the cylinder 141 in a process of the discharge valve 445 being opened and then closed. Accordingly, selection for types of the valve spring 146 can be widened into the compressed coil spring for example, which is easy to be assembled, in addition to the leaf spring.

In addition, since an outer diameter of the guide protrusion 445e is smaller than the inner diameter of the cylinder 141 when the guide protrusion 445e is provided on the spring coupling portion 445b as described above, a gap t3 may be created between an outer circumferential surface of the guide protrusion 445e and the inner circumferential surface of the cylinder 141, or at least one discharge guide groove (not shown) may be formed in a lengthwise direction on the outer circumferential surface of the guide protrusion 445e.

Accordingly, when the discharge valve 445 is in the opening operation, refrigerant in the compression space 103b can be smoothly discharged to the discharge space 104a through the gap t3 between the outer circumferential surface of the guide protrusion 445e and the inner circumferential surface of the cylinder 141 or through the discharge guide groove (not shown).

Figure 21:
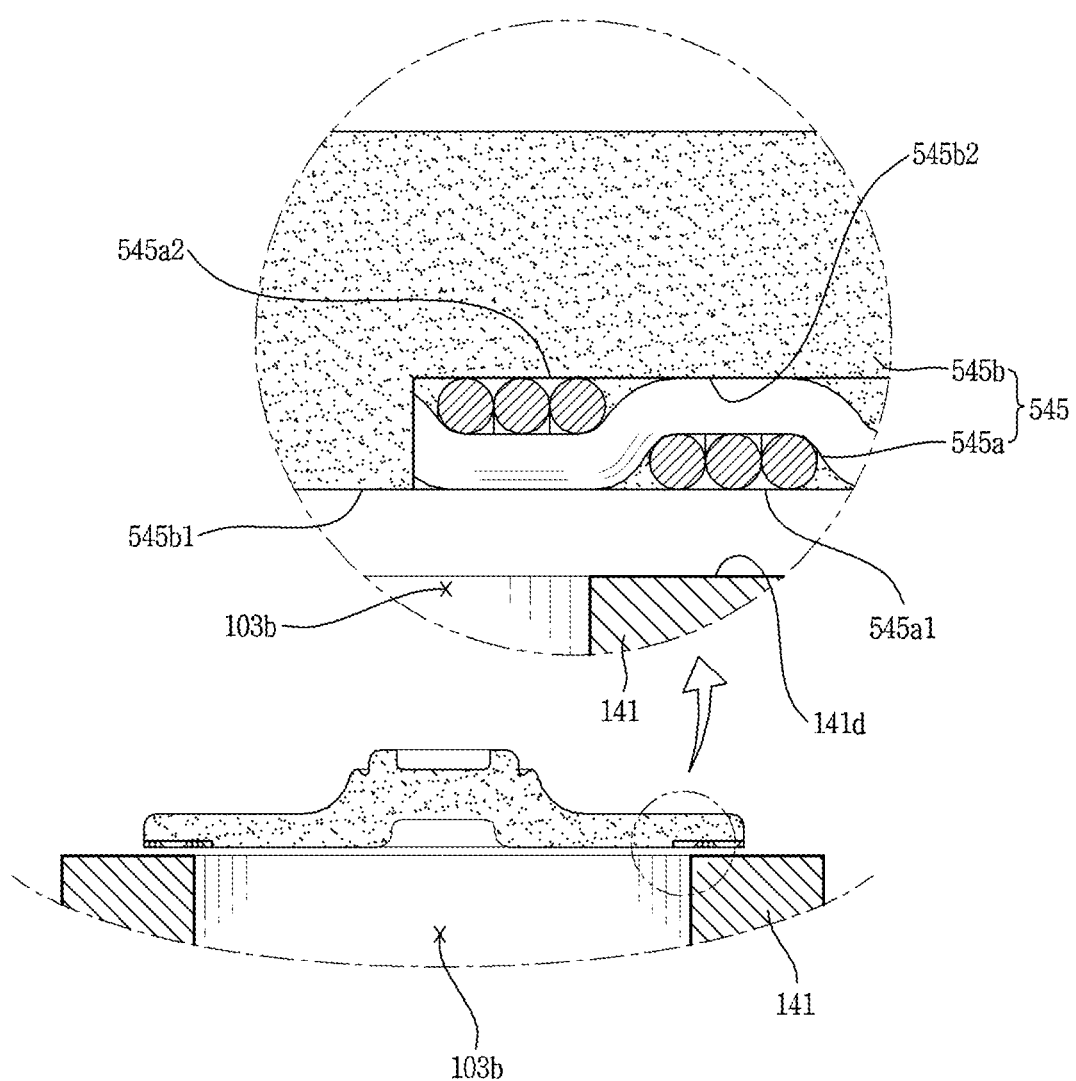
FIG. 21 is a sectional view illustrating still another embodiment of a discharge valve.

Meanwhile, the valve body portion according to this embodiment may be defined in a thin annular plate. FIG. 21 is a sectional view illustrating still another embodiment of a discharge valve.

Referring to FIG. 21, a valve body portion 545a according to this embodiment is defined in an annular shape, more specifically, defined in a thin annular plate. A front end surface of the valve body portion 545a is post-assembled to be coupled to a rim of a rear surface of a spring coupling portion 545b.

As an opening and closing surface (for convenience, a first opening and closing surface 545a1) of the valve body portion 545a is defined in an annular shape, a second opening and closing surface 545b1 is defined on a surface of the spring coupling portion 545b facing the cylinder 141 and located inner circle of the first opening and closing surface 545a1.

Accordingly, a central portion of the second opening and closing surface 545b1 of the spring coupling portion 545b protrudes toward the cylinder 141 to define the second opening and closing surface 545b1, and a rim of the second opening and closing surface 545b1 forms a coupling surface 545b2 stepped lower than the second opening and closing surface 545*b*1. The coupling surface 545*b*2 is closely coupled to a fixed surface 545*a*2 which is a rear surface of the valve body portion 545*a*.

Here, a height of the second opening and closing surface 545*b*1 and a height of the first opening and closing surface 545*a*1 may be defined identical. Accordingly, the second opening and closing surface 545*b*1 and the first opening and closing surface 545*a*1 are in alignment with each other, so that a dead volume of the discharge valve 545 can be minimized while the valve body portion 545*a* is defined in an annular shape.

In the linear compressor according to this embodiment, the reinforced fiber contained in the discharge valve is arranged parallel to the front end surface of the cylinder, thereby increasing the rigidity of the discharge valve while reducing the weight of the discharge valve to enhance responsiveness of the valve. In addition, while the abrasion resistance of the discharge valve is increased, the abrasion of the front end surface of the cylinder due to the discharge valve can be suppressed.

Further, as the reinforced fiber of the discharge valve is woven in a lattice shape or arranged in a one direction in this embodiment, the abrasion of the cylinder can be suppressed while enhancing the rigidity of the discharge valve.

In addition, in this embodiment, as the reinforced fiber of the discharge valve is regularly arranged, the content of the reinforced fiber can be increased. Accordingly, the weight of the valve is reduced while the rigidity of the discharge valve is improved, so that striking sound can be reduced.

In addition, in this embodiment, the fabricating process of the discharge valve can be simplified by compression molding the discharge valve with a single material.

In addition, in this embodiment, the discharge valve is fabricated by assembling a plurality of materials, but the fabricating process can be simplified and material costs can be reduced by including the reinforced fiber only in portions where stiffness is needed. In this case, reliability of the discharge valve can be secured by providing the fixing portion so that the plurality of materials can be tightly coupled.

Although the foregoing description has been given with reference to the preferred embodiment, it will be understood that those skilled in the art will be able to variously modify and change the present disclosure without departing from the scope of the disclosure described in the claims below.

What is claimed is:

1. A linear compressor comprising:
   a cylinder that defines a compression space;
   a discharge valve detachably attached to an end surface of the cylinder and configured to open and close the compression space of the cylinder; and
   a valve spring configured to press the discharge valve toward the end surface of the cylinder,
   wherein the discharge valve comprises:
      a valve body portion having a first surface and a second surface opposite to the first surface, the first surface facing the end surface of the cylinder; and
      a spring coupling portion that is disposed at the second surface of the valve body portion and that connects to the valve spring,
   wherein the valve body portion includes reinforced fibers at the first surface, the reinforced fibers being oriented parallel to the end surface of the cylinder,
   wherein the valve body portion has a disk shape,
   wherein the spring coupling portion is separate from the valve body portion and connected to the second surface of the valve body portion,
   wherein the spring coupling portion includes reinforced fibers,
   wherein the reinforced fibers of the valve body portion are disposed in a different pattern from the reinforced fibers of the spring coupling portion, and
   wherein the reinforced fibers are irregularly disposed in the spring coupling portion,
   wherein the discharge valve comprises a composite unit having a plurality of composite sheets that are stacked in multiple layers, each of the plurality of composite sheets including reinforced fibers that are disposed in one direction in each of the multiple layers,
   wherein the plurality of composite sheets include a first composite sheet and a second composite sheet that is stacked on the first composite sheet, and
   wherein the reinforced fibers of the first composite sheet are disposed in a different direction from the reinforced fibers of the second composite sheet.

2. The linear compressor of claim 1,
   wherein the spring coupling portion includes a material that is lighter than a material of the valve body portion, and
   wherein the material of the spring coupling portion has a greater rigidity than the material of the valve body portion.

3. The linear compressor of claim 1, wherein the valve body portion is separate from the spring coupling portion and connected to the spring coupling portion, and
   wherein the valve body portion is thinner than the spring coupling portion.

4. The linear compressor of claim 1, wherein the valve body portion includes a fixing protrusion at the second surface,
   wherein the spring coupling portion includes a fixing groove or a fixing hole that faces the second surface of the valve body portion and receives the fixing protrusion of the valve body portion.

5. The linear compressor of claim 1, wherein the spring coupling portion includes a fixing protrusion,
   wherein the valve body portion includes a fixing groove or a fixing hole that receives the fixing protrusion of the spring coupling portion.

6. A linear compressor comprising:
   a cylinder that defines a compression space;
   a discharge valve detachably attached to an end surface of the cylinder and configured to open and close the compression space of the cylinder; and
   a valve spring configured to press the discharge valve toward the end surface of the cylinder,
   wherein the discharge valve comprises:
      a valve body portion having a first surface and a second surface opposite to the first surface, the first surface facing the end surface of the cylinder; and
      a spring coupling portion that is disposed at the second surface of the valve body portion and that connects to the valve spring,
   wherein the valve body portion includes reinforced fibers at the first surface, the reinforced fibers being oriented parallel to the end surface of the cylinder,
   wherein the valve body portion has an annular shape defining a hollow portion,
   wherein the spring coupling portion includes a coupling protrusion that is inserted into the hollow portion,
   wherein the valve body portion defines a first opening and closing surface detachable from the end surface of the cylinder, wherein the spring coupling portion includes a guide protrusion extending toward the cylinder, wherein the spring coupling portion defines a second opening and closing surface configured to open and close the compression space of the cylinder without contacting the end surface of the cylinder, and wherein the second opening and closing surface is configured to, based on the discharge valve opening the compression space of the cylinder, be positioned inside the cylinder, wherein the discharge valve comprises a composite unit having a plurality of composite sheets that are stacked in multiple layers, each of the plurality of composite sheets including reinforced fibers that are disposed in one direction in each of the multiple layers, wherein the plurality of composite sheets include a first composite sheet and a second composite sheet that is stacked on the first composite sheet, and wherein the reinforced fibers of the first composite sheet are disposed in a different direction from the reinforced fibers of the second composite sheet.

7. The linear compressor of claim 6, wherein the hollow portion of the valve body portion includes a fixing protrusion or a first fixed end at an inner circumferential surface of the hollow portion, and wherein the coupling protrusion of the spring coupling portion includes a fixing groove that receives the fixing protrusion, or a second fixed end that connects the first fixed end.

8. The linear compressor of claim 6, wherein the coupling protrusion of the spring coupling portion includes a fixing protrusion or a first fixed end at an outer circumferential surface of the coupling protrusion, and wherein the hollow portion of the valve body portion includes a fixing groove that receives the fixing protrusion, or a second fixed end that connects the first fixed end.

9. A linear compressor comprising:

a cylinder that defines a compression space;

a discharge valve detachably attached to an end surface of the cylinder and configured to open and close the compression space of the cylinder; and a valve spring configured to press the discharge valve toward the end surface of the cylinder, wherein the discharge valve comprises:

a valve body portion having a first surface and a second surface opposite to the first surface, the first surface facing the end surface of the cylinder; and a spring coupling portion that is disposed at the second surface of the valve body portion and that connects to the valve spring, wherein the valve body portion includes reinforced fibers at the first surface, the reinforced fibers being oriented parallel to the end surface of the cylinder, wherein a coupling surface is stepped in an annular shape at an edge portion of a second opening and closing surface of the spring coupling portion, the valve body portion being inserted into the coupling surface to define a first opening and closing surface detachable from the end surface of the cylinder, and wherein the valve body portion is thinner than the spring coupling portion, wherein the discharge valve comprises a composite unit having a plurality of composite sheets that are stacked in multiple layers, each of the plurality of composite sheets including reinforced fibers that are disposed in one direction in each of the multiple layers, wherein the plurality of composite sheets include a first composite sheet and a second composite sheet that is stacked on the first composite sheet, and wherein the reinforced fibers of the first composite sheet are disposed in a different direction from the reinforced fibers of the second composite sheet.

* * * * *